(12) United States Patent
Araki

(10) Patent No.: US 7,487,221 B2
(45) Date of Patent: Feb. 3, 2009

(54) NETWORK SYSTEM, DISTRIBUTED PROCESSING METHOD AND INFORMATION PROCESSING APPARATUS

(75) Inventor: Yuichi Araki, Tokyo (JP)

(73) Assignee: Sony Corporation, Tokyo (JP)

( * ) Notice: Subject to any disclaimer, the term of this patent is extended or adjusted under 35 U.S.C. 154(b) by 785 days.

(21) Appl. No.: 11/054,146

(22) Filed: Feb. 9, 2005

(65) Prior Publication Data

US 2005/0204044 A1    Sep. 15, 2005

(30) Foreign Application Priority Data

Feb. 20, 2004    (JP) ............................ P2004-045486

(51) Int. Cl.
*G06F 15/16*    (2006.01)
(52) U.S. Cl. ........................ 709/208; 709/201; 709/202; 709/205; 709/217; 712/28; 712/31
(58) Field of Classification Search ................. 709/208, 709/201, 202, 205, 217; 712/28, 31
See application file for complete search history.

(56) References Cited

U.S. PATENT DOCUMENTS

| 6,526,491 | B2 * | 2/2003 | Suzuoki et al. | 711/164 |
| 6,883,065 | B1 * | 4/2005 | Pittelkow et al. | 711/114 |
| 2003/0115244 | A1 | 6/2003 | Molloy | |
| 2003/0200252 | A1 * | 10/2003 | Krum | 718/102 |

FOREIGN PATENT DOCUMENTS

| JP | 2002-342165 | 11/2002 |
| JP | 2002-351850 | 12/2002 |
| JP | 2002-358289 | 12/2002 |
| JP | 2002-366533 | 12/2002 |
| JP | 2002-366534 | 12/2002 |
| WO | 01/13228 A2 | 2/2001 |

OTHER PUBLICATIONS

Search Report corresponding to European Application No. 05250423.0-1243.

* cited by examiner

*Primary Examiner*—Yves Dalencourt
(74) *Attorney, Agent, or Firm*—Bell, Boyd & Lloyd LLP

(57) ABSTRACT

A network system by which the processing speed of the entire system can be enhanced. The network system includes a number of information processing apparatus connected to each other through a network such that a process can be executed in a distributed fashion. One of the information processing apparatus is set as a master apparatus while the other information processing apparatus are set as slave apparatus. The master information processing apparatus manages information regarding available hardware resources of the individual information processing apparatus connected to the network as apparatus information and manages communication speeds of the individual information processing apparatus connected to the network. One or more of the information processing apparatus by which the process should be executed are specified based on the management information, and a request for execution of the process is issued to the specified information processing apparatus.

6 Claims, 27 Drawing Sheets

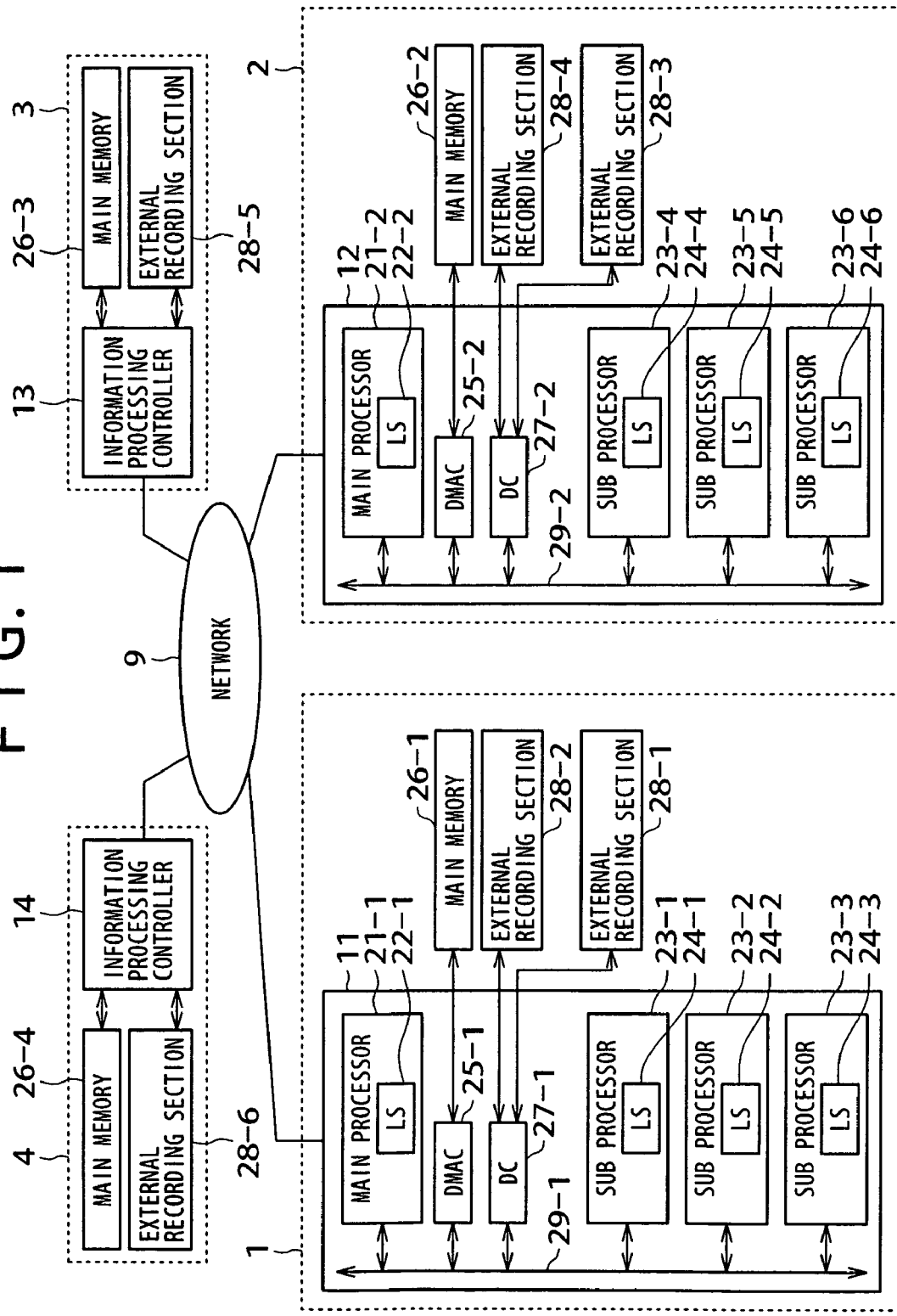

FIG. 2A
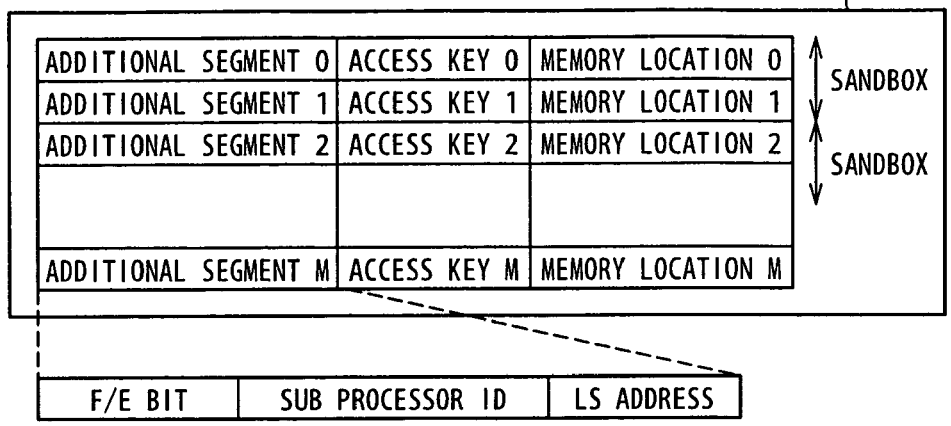
FIG. 2B
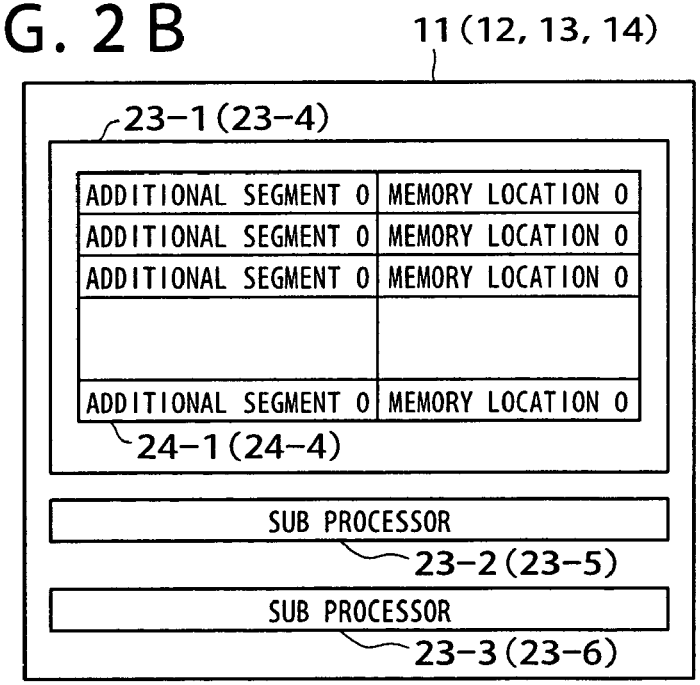
FIG. 2C
KEY MANAGEMENT TABLE
| SUB PROCESSOR ID | | |
|---|---|---|
| 0 | SUB PROCESSOR KEY 0 | KEY MASK 0 |
| 1 | SUB PROCESSOR KEY 1 | KEY MASK 1 |
| 2 | SUB PROCESSOR KEY 2 | KEY MASK 2 |
|  |  |  |
| N | SUB PROCESSOR KEY N | KEY MASK N |

FIG. 20

NETWORK COMMUNICATION SPEED MANAGEMENT TABLE

| SENDER INFORMATION PROCESSING APPARATUS ID \ TRANSMISSION DESTINATION INFORMATION PROCESSING APPARATUS ID | (APPARATUS 1) | (APPARATUS 2) | (APPARATUS 3) | (APPARATUS 4) | (APPARATUS 5) | (APPARATUS 6) |
|---|---|---|---|---|---|---|
| (APPARATUS 1) | — | 300 | 150 | 150 | 100 | 200 |
| (APPARATUS 2) | 300 | — | 50 | 150 | 100 | 200 |
| (APPARATUS 3) | 150 | 50 | — | 50 | 250 | 300 |
| (APPARATUS 4) | 150 | 150 | 50 | — | 150 | 150 |
| (APPARATUS 5) | 100 | 100 | 250 | 150 | — | 300 |
| (APPARATUS 6) | 200 | 200 | 300 | 150 | 300 | — |

FIG. 21

NECESSARY SUB PROCESSOR NUMBER
FOR FUNCTION PROGRAM

| COMMUNICATION SPEED \ FUNCTION PROGRAM ID | 1 | 2 | 3 | ---- | N |
|---|---|---|---|---|---|
| ~50 | 3 | 3 | 6 | | 3 |
| 50~200 | 2 | 2 | 5 | | 3 |
| 200~500 | 1 | 2 | 5 | | 2 |
| 500~ | 1 | 1 | 4 | | 2 |

FIG. 26

NETWORK COMMUNICATION SITUATION
MANAGEMENT TABLE

| RECEPTION TIME | SUB PROCESSOR ID | COMMUNICATION TYPE | INFORMATION PROCESSING APPARATUS ID OF COMMUNICATION COUNTERPART | STORAGE/RECORDING SECTION ID OF COMMUNICATION COUNTERPART | ADDRESS OF COMMUNICATION COUNTERPART | COMMUNICATION SIZE | COMMUNICATION OPTION ID | COMMUNICATION SPEED Dspt |
|---|---|---|---|---|---|---|---|---|
| 12.34.56 | 000058 | 0 | (APPARATUS 5) | (EXTERNAL RECORDING SECTION 28-7) | 0x300000 | 1024byte | 0 | 40 |
| 12.34.78 | 000058 | 1 | (APPARATUS 6) | (EXTERNAL RECORDING SECTION 28-8) | 0x5A0000 | 1024byte | 0 | 30 |
| ... | | | | | | | | |

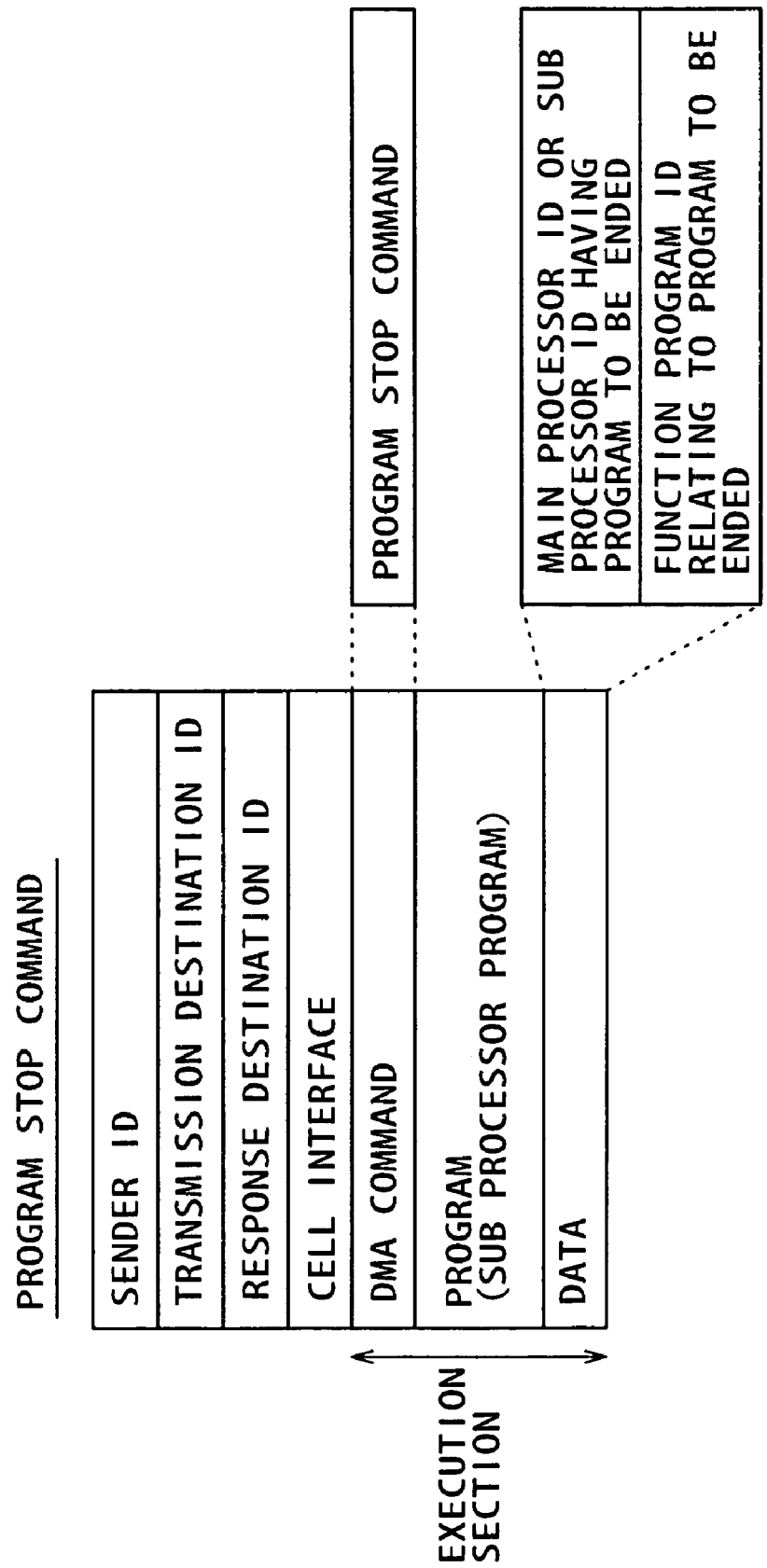

NETWORK SYSTEM, DISTRIBUTED PROCESSING METHOD AND INFORMATION PROCESSING APPARATUS

BACKGROUND OF THE INVENTION

The present invention relates to a network system, a distributed processing method and an information processing apparatus by which a process can be performed in a distributed manner by a number of information processing apparatus connected to each other by a network.

Recently, attention is paid to grid computing. The grid computing is a technique which implements a high arithmetic operation performance through cooperative operation of a number of information processing apparatus connected to each other by a network. Relating techniques are disclosed, for example, in Japanese Patent Laid-Open No. 2002-342165 (hereinafter referred to as Patent Document 1), Japanese Patent Laid-Open No. 2002-351850 (hereinafter referred to as Patent Document 2), Japanese Patent Laid-Open No. 2002-358289 (hereinafter referred to as Patent Document 3), Japanese Patent Laid-Open No. 2002-366533 (hereinafter referred to as Patent Document 4), and Japanese Patent Laid-Open No. 2002-366534 (hereinafter referred to Patent document 5).

In the known techniques, a sub-processor in an information processing apparatus can access data in a main memory not only of the information processing apparatus but also of a different information processing apparatus to read out data into a local storage for exclusive use for the sub-processor and perform processing. Further, since a software cell can be used to transmit the body of a program and data between the information processing apparatus, when it is desired to cause an application to be processed in a fixed period of time, it is possible to transmit the application program to a required number of sub-processors in advance and then transmit data so that the processing may be performed in a distributed manner by the sub-processors.

Usually, however, the communication speed between information processing apparatus varies incessantly depending upon the congestion situation of the network, the use situation of hardware resources in the individual information processing apparatus and so forth. Therefore, only if those information processing apparatus which should be used to execute an application are specified taking only the specifications of available hardware resources into consideration, there is the possibility that a situation may occur that the application demanded to complete the processing in a fixed period of time cannot be processed in the fixed period of time.

SUMMARY OF THE INVENTION

The present invention seeks to provide a network system, a distributed processing method and an information processing apparatus by which the processing speed of the entire system can be enhanced.

According to an embodiment of the present invention, there is provided a network system including:

a number of information processing apparatus connected to each other through a network and capable of executing a process in a distributed fashion;

with each of the information processing apparatus including:

a master/slave setting section for setting the information processing apparatus in which the master/slave setting section is provided as a master apparatus or a slave apparatus such that one of the information processing apparatus connected to the network is set as a master apparatus while the other information processing apparatus are set as slave apparatus;

an apparatus information management section for managing, where the information processing apparatus in which the apparatus information management section is provided is set as the master apparatus by the master/slave setting section, information regarding available hardware resources of individual ones of the information processing apparatus connected to the network as apparatus information;

a communication speed management section for managing, where the information processing apparatus in which the communication speed management section is provided is set as the master apparatus by the master/slave setting section, communication speeds of individual ones of the information processing apparatus connected to the network; and a distributed processing requesting section for specifying one or more of the information processing apparatus by which the process should be executed based on the information managed by the apparatus information management section and the communication speed management section and issuing a request for execution of the process to the specified information processing apparatus.

According to another embodiment of the present invention, there is provided a distributed processing method wherein a process is executed in a distributed fashion by a number of information processing apparatus connected to each other through a network, the method including;

a first step of setting one of the information processing apparatus as a master apparatus while the other information processing apparatus are set as slave apparatus;

a second step executed by the information processing apparatus set as the master apparatus of managing information regarding available hardware resources of individual ones of the information processing apparatus connected to the network as apparatus information and managing communication speeds of individual ones of the information processing apparatus connected to the network; and a third step executed by the information processing apparatus set as the master apparatus of specifying one or more of the information processing apparatus by which the process should be executed based on the information managed at the second step and issuing a request for execution of the process to the specified information processing apparatus.

According to still another embodiment of the present invention, there is provided an information processing apparatus including:

a communication section for communicating with any of different ones of information processing apparatus connected thereto through a network;

a master/slave setting section for setting the information processing apparatus itself as a single master apparatus or one of slave apparatus among all of the information processing apparatus connected to the network;

an apparatus information management section for managing, where the information processing apparatus is set as the master apparatus by the master/slave setting section, information regarding available hardware resources of individual ones of the information processing apparatus connected to the network as apparatus information;

a communication speed management section for managing, where the information processing apparatus is set as the master apparatus by the master/slave setting section, communication speeds of individual ones of the information processing apparatus connected to the network; and a distributed processing requesting section for specifying one or more of the information processing apparatus by which a process should be executed based on the information managed by the apparatus information management section and the communication speed management section and issuing a request for execution of the process to the specified information processing apparatus.

In summary, with the network system, distributed processing method and information processing apparatus, enhancement of the processing system of the entire system where a process is executed in a distributed fashion by a number of information processing apparatus can be anticipated.

Additional features and advantages of the present invention are described in, and will be apparent from, the following Detailed Description of the Invention and the Figures.

BRIEF DESCRIPTION OF THE FIGURES

FIG. 1 is a block diagram showing an example of a configuration of a network system to which the present invention is applied.

FIGS. 2A, 2B and 2C are views illustrating operation of an information processing controller provided in an information processing apparatus to which the present invention is applied.

FIG. 20 is a view showing a network communication speed management table managed by a master apparatus.

FIG. 21 is a view showing the number of sub-processors required for each function program.

FIG. 26 is a view showing another network communication situation management table managed by the master apparatus.

FIG. 27 is a view showing a software cell where a DMA command is a program stop command.

DETAILED DESCRIPTION OF THE INVENTION

Figure 3:
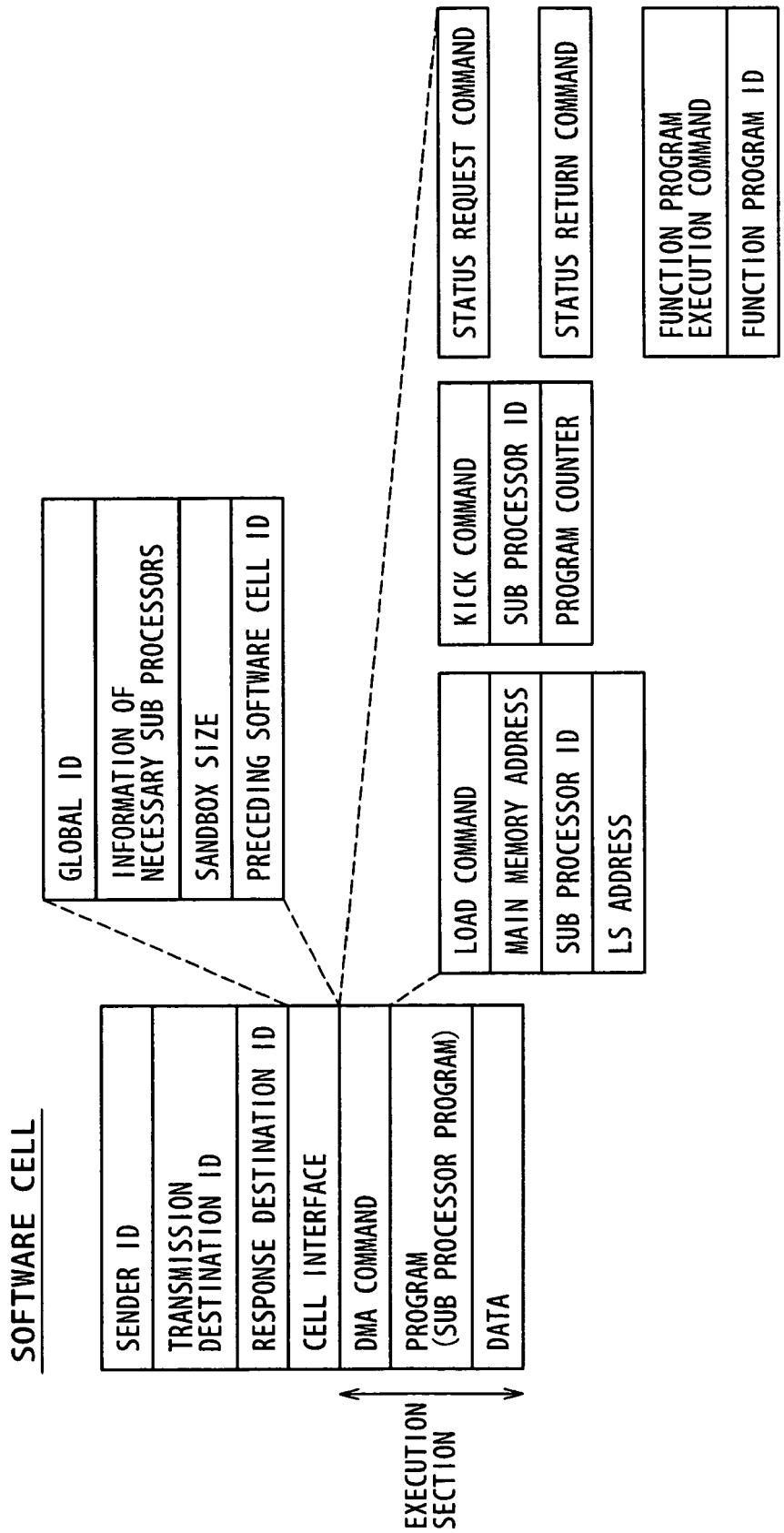
FIG. 3 is a view showing an example of a configuration of a software cell.

Basic Configuration of the Network System and the Information Processing Apparatus: FIGS. 1 to 4

FIG. 1 shows an example of a network system to which the present invention is applied. Referring to FIG. 1, the network system shown includes a number of information processing apparatus 1, 2, 3 and 4 connected to each other through a network 9.

Information Processing Apparatus and Information Processing Controller

The information processing apparatus 1, 2, 3 and 4 typically are such various AV (Audio and Visual) apparatus and portable apparatus as hereinafter described.

The information processing apparatus 1 includes an information processing controller 11 as a computer function section. The information processing controller 11 includes a main processor 21-1, sub-processors 23-1, 23-2, and 23-3, a direct memory access controller (DMAC) 25-1, and a disk controller (DC) 27-1.

The main processor 21-1 performs schedule management of program execution (data processing) by the sub-processors 23-1, 23-2, and 23-3 and general management of the information processing controller 11 (information processing apparatus 1). However, the main processor 21-1 may be configured otherwise such that a program other than the program for performing the management operates in the main processor 21-1. In this instance, the main processor 21-1 functions also as a sub-processor. The main processor 21-1 includes a local storage (LS) 22-1.

Although each information processing apparatus may include a single sub-processor, preferably it includes a number of sub-processors. In the example shown in FIG. 1, each of the information processing apparatus 1, 2, 3, and 4 includes a number of sub-processors.

The sub-processors 23-1, 23-2, and 23-3 execute programs parallelly and independently of each other to process data under the control of the main processor 21-1. Further, according to circumstances, a program in the main processor 21-1 may operate in cooperation with a program in any of the sub-processors 23-1, 23-2, and 23-3. A function program hereinafter described also operates in the main processor 21-1. In addition, the sub-processors 23-1, 23-2, and 23-3 include local storages 24-1, 24-2, and 24-3, respectively.

The direct memory access controller 25-1 accesses programs and data stored in a main memory 26-1 connected to the information processing controller 11 and formed from a DRAM (dynamic RAM) or the like without intervention of a processor. The disk controller 27-1 controls an accessing operation to external recording sections 28-1 and 28-2 connected to the information processing controller 11.

The external recording sections 28-1 and 28-2 may have a form of any of a fixed disk (hard disk) and a removable disk. As such a removable disk as just mentioned, various recording media such as an MO, an optical disk such as a CD±RW or a DVD±RW, a memory disk, an SRAM (static RAM), and a ROM can be used. The disk controller 27-1 is an external recording section controller although it is called disk controller.

The information processing controller 11 may be configured such that a number of external recording sections 28 are connected thereto as seen in FIG. 1.

The main processor 21-1, sub-processors 23-1, 23-2, and 23-3, direct memory access controller 25-1, and disk controller 27-1 are connected to each other by a bus 29-1.

An identifier is allocated as an information processing apparatus ID to the information processing controller 11. The identifier can identify the information processing apparatus 1, which incorporates the information processing controller 11, uniquely over the entire network.

Also, to each of the main processor 21-1 and the sub-processors 23-1, 23-2, and 23-3, an identifier with which it can be identified is allocated as a main processor ID or a sub-processor ID similarly.

Preferably, the information processing controller 11 is formed as a one-chip IC (Integrated Circuit).

The other information processing apparatus 2, 3, and 4 are configured in a similar manner; therefore, overlapping description of them is omitted herein to avoid redundancy. Here, it is to be noticed that those units of reference characters having the same parent number operate similarly unless otherwise specified even if they have different branch numbers. Thus, in the following description, where the branch number of reference characters is omitted, the units are the same irrespective of the difference in branch number.

Accessing from Each Sub-Processor to the Main Memory

As described hereinabove, although each of the sub-processors 23 in one information processing controller executes a program independently to process data, if different sub-processors perform reading out or writing at a time from or into same areas in the main memories 26, then mismatching of data possibly may occur. Therefore, accessing from the sub-processors 23 to the main memories 26 is performed in accordance with the following procedure.

Referring to FIG. 2A, the main memory 26 is formed from memory locations with which a number of addresses can be designated, and an additional segment for storing information indicative of a state of data is allocated to each memory location. The additional segment includes an F/E bit, a sub-processor ID, and an LS address (Local Storage address). Moreover, an access key hereinafter described is allocated to each memory location. The F/E bit is defined in the following manner.

The F/E bit=0 represents that the data in the corresponding memory location is data being read and processed by a sub-processor 23 or invalid data which is not the latest data since the location is in a blank state and is disabled from being read out. Further, the F/E bit=0 indicates that data may be written into the corresponding memory location, and the F/E bit is set to 1 after writing into the memory location.

The F/E bit=1 represents that data of the corresponding memory location is not read out by any sub-processor 23 and is the latest data not yet processed. The data of the memory location can be read out. After the sub-processor 23 read out the data, the F/E bit is set to 0. Further, the F/E bit=1 represents that the memory location is disabled from writing of data.

Further, in the state of the F/E bit=0 (readout disabled/writing enabled), it is possible to set a readout reservation with regard to the memory location. When readout reservation is to be performed with regard to a memory location wherein the F/E bit=0, a sub-processor 23 writes the sub-processor ID and the LS address of the sub-processor 23 as readout reservation information into the additional segment of the memory location with regard to which the readout reservation is performed.

Thereafter, the sub-processor 23 on the data writing side writes the data into the memory location having the readout reservation, and the F/E bit is set to F/E bit=1 (readout enabled/writing disabled). Then, the sub-processor ID and the LS address written as the readout reservation information in the additional segment in advance are read out.

Where there is the necessity to process data at multiple stages using a number of sub-processors, if readout/writing of data of each memory location are controlled in such a manner as described above, then immediately after data processed by a processor 23, which performs a process at a preceding stage, is written into a predetermined address on the main memory 26, another sub-processor 23, which performs a process at a succeeding stage, can read out the pre-processed data.

FIG. 2B illustrates memory locations of a local storage 24 in each sub-processor 23. Referring to FIG. 2B, the local storage 24 in each sub-processor 23 is also formed from memory locations with which a number of addresses can be designated. An additional segment is allocated similarly to each of the memory locations. The additional segment includes a busy bit.

When the sub-processor 23 is to read out data in the main memory 26 into a memory location of the local storage 24 thereof, it sets the corresponding busy bit to 1 to make reservation. Other data cannot be stored into any memory location with regard to which the busy bit is 1. After reading out of the memory location of the local storage 24, the busy bit is changed to 0 so that the memory location can be used for an arbitrary object later.

Referring back to FIG. 2A, the main memory 26 connected to each information processing controller includes a number of sandboxes. The sandboxes define areas in the main memory 26, and each sandbox is allocated for each sub-processor 23 and can be used exclusively by the pertaining sub-processor. In other words, each of the sub-processors 23 can use a sandbox allocated thereto but cannot access data exceeding the area of the sandbox.

The main memory 26 is formed from a number of memory locations, and a sandbox is a set of such memory locations.

Further, in order to implement exclusive control of the main memory 26, a key management table as shown in FIG. 2C is used. The key management table is stored in a comparatively high speed memory such as an SRAM in the information processing controller and is coordinated with a direct memory access controller 25. Each entry in the key management table includes a sub-processor ID, a sub-processor key, and a key mask.

The process when the sub-processor 23 uses the main memory 26 is described below. First, the sub-processor 23 outputs a readout or writing command to the direct memory access controller 25. This command includes the sub-processor ID of the sub-processor and an address of the main memory 26, which is a destination of the request for use.

Before the direct memory access controller 25 executes this command, it refers to the key management table to detect the sub-processor key of the sub-processor of the source of the request for use. Then, the direct memory access controller 25 compares the detected sub-processor key of the source of the request for use with the access key allocated to the memory location shown in FIG. 2A in the main memory 26, which is the destination of the request for use. Then, only when the keys coincide with each other, the direct memory access controller 25 executes the command described above.

The key mask on the key management table shown in FIG. 2C may set, when an arbitrary bit thereof is set to the value 1, a corresponding bit of the sub-processor key coordinated with the key mask to 0 or 1.

It is assumed that, for example, the sub-processor key is 1010. Usually, the sub-processor key enables accessing only to a sandbox having the access key of 1010. However, if the key mask coordinated with the sub-processor key is set to 0001, then the coincidence determination between a sub-processor key and an access key is masked only with regard to the digit in which the bit of the key mask is set to 1. Consequently, the sub-processor key of 1010 enables accessing to a sandbox having the access key of 1010 or 1011.

The exclusive property of the sandboxes of the main memory 26 is implemented in such a manner as described above. In short, where there is the necessity for a number of sub-processors in an information processing controller to process data at multiple stages, if the configuration described above is applied, then only a sub-processor which performs a process at a preceding stage and another sub-processor which performs a process at a succeeding stage are permitted to access a predetermined address of the main memory 26. Consequently, the data can be protected.

Such exclusive control of the memory can be used, for example, in the following manner. First, immediately after the information processing apparatus is started, the values of the key masks are all zero. It is assumed that a program in the main processor is executed and operates in a cooperating relationship with programs in the sub-processors. When it is intended to store processing result data outputted from a first sub-processor once into the main memory and then input the processing result data to a second sub-processor, it is necessary that the pertaining main memory area can be accessed from the two sub-processors. In such an instance, the program in the main processor changes the values of the key masks suitably to provide a main memory area, which can be accessed from the number of sub-processors, to allow multi-stage processing by the sub-processors.

More particularly, when multi-stage processing is to be performed in the process of data from a different information processing apparatus→processing by the first sub-processor→first main memory area→processing by the second sub-processor→second main memory area, the second processor cannot access the first main memory area if the following settings are maintained:

sub-processor key of the first sub-processor, 0100;
access key of the first main memory area, 0100;
sub-processor key of the second sub-processor, 0101; and
access key of the second main memory area, 0101.

Thus, if the key mask of the second sub-processor is changed to 0001, then the second sub-processor is permitted to access the first main memory area.

Production and Configuration of a Software Cell

In the network system of FIG. 1, a software cell is transmitted between the information processing apparatus 1, 2, 3, and 4 so that distributed processing may be performed by the information processing apparatus 1, 2, 3, and 4. In particular, the main processor 21 included in the information processing controller in a certain information processing apparatus produces a software cell including a command, a program, and data and transmits the software cell to another information processing apparatus through the network 9 to achieve distribution of processing.

FIG. 3 shows an example of a configuration of a software cell. Referring to FIG. 3, the software cell of the present example generally includes a sender ID, a transmission destination ID, a response destination ID, a cell interface, a DMA command, a program and data.

The sender ID includes a network address of an information processing apparatus of the sender of the software cell and the information processing apparatus ID of the information processing controller in the information processing apparatus. The sender ID includes identifiers (main processor ID and sub-processor IDs) of the main processor 21 and the sub-processors 23 included in the information processing controller in the information processing apparatus.

The sender ID and the response destination ID individually include the same information regarding an information processing apparatus of the transmission destination of the software cell and an information processing apparatus of the response destination of a result of execution of the software cell.

The cell interface is information necessary for utilization of the software cell and includes a global ID, information of necessary sub-processors, a sandbox size, and a preceding software cell ID.

The global ID allows unique identification of the software cell through the entire network and is produced based on the sender ID and the date and hour of production or transmission of the software cell.

The information of necessary sub-processors has set therein the number of sub-processors necessary for execution of the software cell. The sandbox side has set therein the memory capacities in the main memory 26 and the local storages 24 of the sub-processors 23 necessary for execution of the software cell.

The preceding software cell ID is an identifier of a preceding software cell among software cells of one group, which requires sequential execution such as streaming data.

An execution section of a software cell is formed from the DMA command, program, and data. The DMA command includes a series of DMA commands necessary to start the program, and the program includes sub-processor programs to be executed by the sub-processors 23. The data here is data to be processed by the program including the sub-processor programs.

The DMA command further includes a load command, a kick command, a function program execution command, a status request command, and a status return command.

The load command is a command for loading information in the main memory 26 into the local storage 24 of a sub-processor 23 and includes, in addition to the load command itself, a main memory address, a sub-processor ID, and an LS (Local Storage) address. The main memory address indicates an address of a predetermined area in the main memory 26, which is a load source of the information. The sub process ID and the LS address indicate the identifier and the address of the local storage 24 of the sub-processor 23 of a load destination of the information.

The kick command is a command for starting execution of a program and includes, in addition to the kick command, a sub-processor ID and a program counter. The sub-processor ID identifies a sub-processor 23 of a kicking object, and the program counter provides an address for the program counter for execution of the program.

The function program execution command is a command (hereinafter described) used for a certain information processing apparatus to request another information processing apparatus for execution of a function program. The information processing controller in the information processing apparatus, which receives the function program execution command, identifies a function program to be started from a function program ID (hereinafter described).

The status request command is a command for requesting for transmission of apparatus information regarding a current operation state (situation) of an information processing apparatus indicated by the transmission destination ID to an information processing apparatus indicated by the response destination ID. While the function program is hereinafter described, it is a program categorized into a function program in FIG. 6, which illustrates a configuration of software stored in the main memory 26. The function program is loaded into the main memory 26 and executed by the main processor 21.

The status return command is a command used for an information processing apparatus, which receives the status request command, to issue a response of apparatus information of the information processing apparatus itself to an information processing apparatus indicated by the response destination ID included in the status request command.

Figure 4:
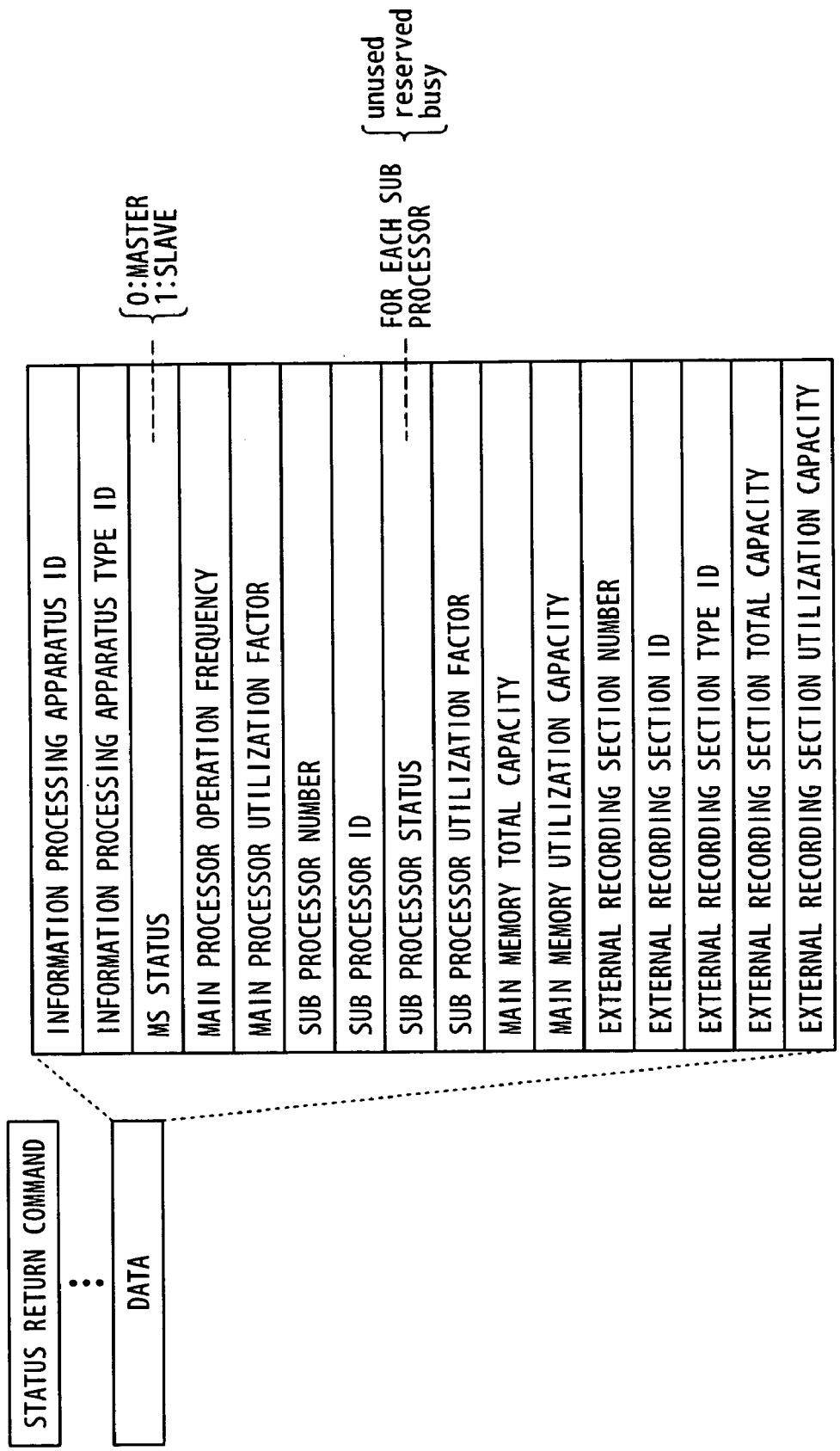
FIG. 4 is a view illustrating a data area of a software cell where a DMA command is a status returning command.

FIG. 4 illustrates a structure of the data area of a software cell where the DMA command is the status return command.

Referring to FIG. 4, the information processing apparatus ID is an identifier for identifying an information processing apparatus, which includes an information processing controller, and represents the ID of an information processing apparatus that transmits the status return command. The information processing apparatus ID is produced, when the power supply is made available, based on the date and hour when the power supply is made available, the network address of the information processing apparatus, the number of sub-processors 23 included in the information processing controller in the information processing apparatus, and so forth by the main processor 21 included in the information processing controller in the information processing apparatus.

The information processing apparatus type ID includes a value representative of a characteristic of the information processing apparatus. The characteristic of the information processing apparatus may be, for example, a hard disk recorder (hereinafter described), a PDA (Personal Digital Assistant), a portable CD (Compact Disc) player, or the like. The information processing apparatus type ID may be of the type representing a function that the information processing apparatus has such as image and sound recording or image and sound reproduction. The value representative of a characteristic or a function of an information processing apparatus is determined in advance. If the information processing apparatus type ID is read out, then a characteristic or a function of the information processing apparatus can be grasped.

The MS (Master/Slave) status represents which one of a master apparatus and a slave apparatus operates the information processing apparatus as hereinafter described. Where the MS status is set to 0, this represents that the information processing apparatus should operate as a master apparatus, but where the MS status is set to 1, this represents that the information processing apparatus should operate as a slave apparatus.

The main processor operation frequency represents an operation frequency of the main processor 21 in the information processing controller. The main processor utilization factor represents the utilization factor in the main processor 21 regarding all programs which are presently operating in the main processor 21. The main processor utilization factor is a value representing the ratio of the processing capacity currently being used to the overall processing capacity of the object main processor and is calculated, for example, in a unit of MIPS, which is a unit for evaluation of the processor processing capacity, or based on the processor utilization time per unit time. This similarly applies to a sub-processor utilization factor hereinafter described.

The sub-processor number represents the number of sub-processors 23 provided in the information processing controller. The sub-processor ID represents an identifier for identification of a sub-processor 23 in the information processing controller.

The sub-processor status represents a status of the sub-processor 23 and may be one of an unused status, a reserved status, a busy status, and so forth. The unused status indicates that the sub-processor is not used at present and is not reserved for use either. The reserved status indicates that the sub-processor is not used but is reserved for use. The busy status indicates that the sub-processor is currently used.

The sub-processor utilization factor represents the utilization factor in the sub-processor regarding a program being executed by the sub-processor or being reserved for execution in the sub-processor. In other words, the sub-processor utilization factor indicates the utilization factor at present where the sub-processor status is busy, but indicates an estimated utilization factor with which the sub-processor is planned to be used later where the sub-processor status is reserved.

One set of the sub-processor ID, sub-processor status, and sub-processor utilization factor is set for one sub-processor 23. Consequently, a number of sets corresponding to the number of sub-processors 23 in one information processing controller are set.

The main memory total capacity and the main memory utilization capacity represent the total capacity and the capacity being currently used of the main memory 26 connected to the information processing controller, respectively.

The external recording section number represents the number of external recording sections 28 connected to the information processing controller. The external recording section ID is information for unique identification of each of the external recording sections 28 connected to the information processing controller. The external recording section type ID represents the type of each of the external recording sections 28; for example, a hard disk, a CD±RW, a DVD±RW, a memory disk, an SRAM, a ROM, or the like.

The external recording section total capacity and the external recording section utilization capacity represent the total capacity and the currently used capacity of an external recording section 28 identified with the external recording section ID, respectively.

A set of the external recording section ID, external recording section type ID, external recording section total capacity, and external recording section utilization capacity is set for one external recording section 28. Consequently, a number of sets corresponding to the number of external recording sections 28 connected to the information processing controller are set. In particular, where a number of external recording sections are connected to an information processing controller, different external recording section IDs are applied individually to the external recording sections, and the external recording section type IDs, external recording section total capacities, and external recording section utilization capacities are managed separately from each other.

Execution of a Software Cell

The main processor 21 included in the information processing controller in a certain information processing apparatus produces a software cell having a configuration as described above and transmits a different information processing apparatus and the information processing controller in the different information processing apparatus through the network 9. The information processing apparatus of the sender, the information processing apparatus of the transmission destination, the information processing apparatus of the response destination, and the information processing controllers in the apparatus described are individually identified with the sender ID, transmission destination ID, and response destination ID described hereinabove, respectively.

The main processor 21 included in the information processing controller in the information processing apparatus receiving the software cell stores the software cell into the main memory 26. Further, the main processor 21 of the transmission destination reads out the software cell and processes the DMA command included in the software cell.

In particular, the main processor 21 of the transmission destination first executes the load command. Consequently, the information is loaded from the main address indicated by the load command into a predetermined area of the local storage 24 in a sub-processor specified by the sub-processor ID and the LS address included in the load command. The information loaded here is a sub-processor program or data or some other indicated data included in the received software cell.

Then, the main processor 21 outputs the kick command to a sub-processor indicated by the sub-processor ID included in the kick command together with a program counter included in the kick command similarly.

The indicated sub-processor executes the sub-processor program in accordance with the kick command and the program counter. Then, the sub-processor stores a result of the execution into the main memory 26, and then notifies the main processor 21 of completion of the execution.

It is to be noted that the processor executing the software cell in the information processing controller in the information processing apparatus of the transmission destination is not limited to a sub-processor 23, but it is possible to designate the main processor 21 so as to execute a main memory program such as a function program included in the software cell.

In this instance, the information processing apparatus of the sender transmits, to the information processing apparatus of the transmission destination, a software cell whose DMA command is the load command. The software cell includes a main memory program and data to be processed by the main memory program in place of the sub-processor program. The main memory program and the data to be processed by the main memory program are stored into the main memory 26. Then, the information processing apparatus of the sender transmits, to the information processing apparatus of the transmission destination, a software cell whose DMA command is the kick command or the function program execution command. The software cell includes the main processor ID and main memory address of the information processing controller in the information processing apparatus of the transmission destination, an identifier for identification of the main memory program such as a function program ID hereinafter described, and a program counter. Thus, the main processor 21 may execute the main memory program.

As described above, in the network system according to the present embodiment, an information processing apparatus of the sender transmits a sub-processor program or a main memory program in the form of a software cell to an information processing apparatus of the transmission destination. Further, the information processing apparatus of the sender causes the information processing controller in the information processing apparatus of the transmission destination to load the sub-processor program into a sub-processor 23. Consequently, the information processing apparatus of the sender can cause the information processing apparatus of the transmission destination to execute the sub-processor program or the main memory program.

Where the program included in the received software cell is a sub-processor program, the information processing controller in the information processing apparatus of the transmission destination loads the sub-processor program into a designated sub-processor. Thus, the information processing controller causes the sub-processor to execute the sub-processor program or the main memory program included in the software cell.

Accordingly, even if the user does not operate the information processing apparatus of the transmission destination, the sub-processor program or the main memory program can be executed automatically by the information processing controller in the information processing apparatus of the transmission destination.

In this manner, any information processing apparatus can acquire, where the information processing controller thereof does not include a sub-processor program or a main memory program such as a function program, such programs from anther information processing apparatus connected thereto by the network. Further, different sub-processors can transfer data therebetween in accordance with the DMA system and such sandboxes as described hereinabove are used. In such a case, even where it is necessary to process data at multiple states within one information processing controller, the processing can be executed at a high speed and with a high degree of security.

Distributed Processing of the Network System: FIGS. 5 to 15

Figure 5:
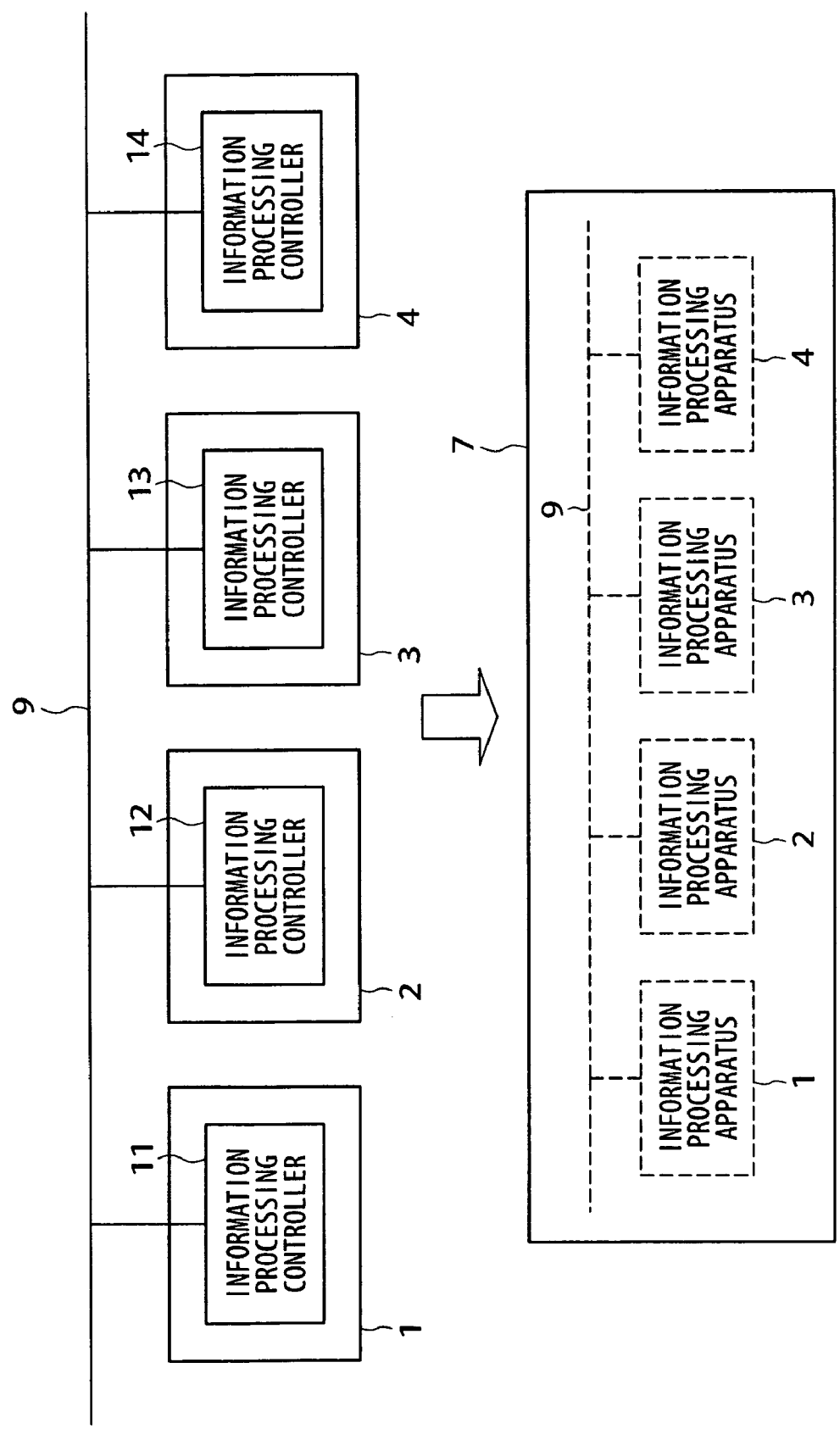
FIG. 5 is a diagrammatic view showing a number of information processing apparatus in a manner wherein they operate as a virtual single information processing apparatus.

As a result of the distributed processing through use of a software cell, the multiple information processing apparatus 1, 2, 3, and 4 connected to the network 9 as seen at the upper stage in FIG. 5 operate as a virtual single information processing apparatus 7 as seen at the lower stage in FIG. 5. However, to this end, processes described below must be executed by the following configuration.

Software Configuration of the System and Loading of a Program

Figure 6:
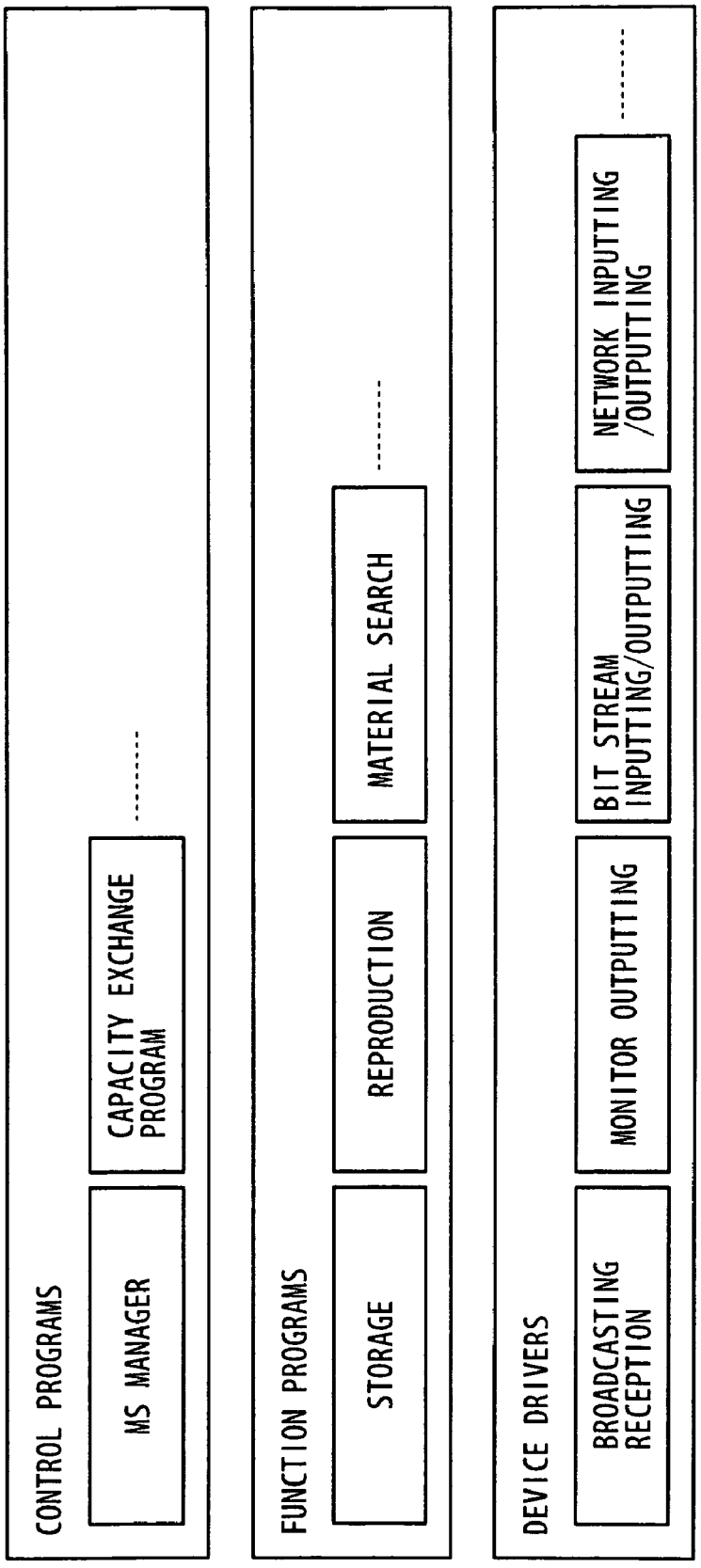
FIG. 6 is a diagrammatic view illustrating an example of a software configuration of an information processing controller.

FIG. 6 illustrates a configuration of software to be stored by the main memories 26 of the individual information processing controllers. Referring to FIG. 6, the pieces of software (programs) are recorded in an external recording section 28 connected to the information processing controller before the power supply is made available to the information processing apparatus.

The programs are categorized, depending upon the function or characteristic thereof, into control programs, function programs and device drivers.

The control programs are provided commonly in the information processing controllers and executed by the main processor 21 in each of the information processing controllers. The control programs include an MS (Master/Slave) manager and a capacity exchange program hereinafter described.

The main processors 21 execute the function programs and, for each information processing apparatus, function programs such as a recording program, a reproduction program, a material search program, and so forth are provided for the information processing controller.

The device drivers are provided for inputting and outputting (transmission and reception) of each information processing controller (information processing apparatus), and such devices as those for broadcast reception, monitor outputting, bit stream inputting/outputting, network inputting/outputting, and so forth, which are suitable for each of the information processing apparatus, are provided for the information processing controller.

When the power supply is made available to an information processing apparatus in a state wherein the information processing apparatus is physically connected to the network 9 by connection of a cable or the like and, consequently, the information processing apparatus is connected to the network 9 electrically and functionally, the main processor 21 of the information processing controller of the information processing apparatus loads the programs belonging to the control programs and the programs belonging to the device drivers into the main memory 26.

As a loading procedure, the main processor 21 first controls the disk controller 27 to execute a reading out instruction to read out the programs from the external recording section 28 and then controls the direct memory access controller 25 to execute a writing instruction to write the programs into the main memory 26.

The programs belonging to the function programs may be handled such that only a necessary one of the programs is loaded when necessary or otherwise such that all of them are loaded immediately after the main power supply is made available similarly to the programs belonging to the other categories.

The programs belonging to the function programs need not necessarily be recorded in the external recording sections 28 of all of the information processing apparatus connected to the network, but if they are recorded in an external recording section 28 of any one of the information processing apparatus, they can be loaded into the other information processing apparatus by the method described hereinabove. As a result, the function programs can be executed by the virtual single information processing apparatus 7 as shown at the lower stage of FIG. 5.

A function program processed by the main processor 21 as described above sometimes operates in cooperation with a sub-processor program processed by a sub-processor 23. Therefore, when the main processor 21 reads out a function program from an external recording section 28 and writes the function program into the main memory 26, if a sub-processor program which is to operate in cooperation with the function program exists, then the sub-processor program also is written into the same main memory 26 together. In this instance, the number of such sub-processor programs which operate cooperatively may be either a single number or a multiple number. Where the number is a multiple number, all of the sub-processor programs to operate cooperatively are written into the main memory 26. Each of the sub-processor programs written in the main memory 26 is thereafter written into the local storage 24 of a sub-processor 23 and operates in cooperation with the function program processed by the main processor 21.

As described hereinabove in connection with the software cell shown in FIG. 3, an identifier, which can be identified uniquely, is allocated as a function program ID to each of the function programs. The function program ID is determined from the date and hour of production, the information processing apparatus ID, and so forth at a stage of production of the function program.

Further, a sub-processor program ID is allocated to each of the sub-processor programs so that each of the sub-processor programs can be identified uniquely. The sub-processor program ID to be allocated may be an identifier having some relationship with the function program ID of the function program which is the other party of the cooperative operation such as, for example, an identifier formed from the function program ID as a parent number and a branch number added to the tail end of the parent number. Alternatively, an identifier may have no relationship with the function program ID of the function program which is the other party of the cooperative operation. Anyway, where a function program and a sub-processor program should operate cooperatively with each other, it is necessary for each of them to mutually retain the program ID of the identifier of the other party in the program itself. Also, where a function program should operate cooperatively with a number of sub-processor programs, it is necessary for the function program to retain the sub-processor program IDs of all of the sub-processor programs.

The main processor 21 secures, in the main memory 26, an area for storing apparatus information (information relating to an operation state) of the information processing apparatus in which the main processor 21 operates, and records the information as an apparatus information table of the information processing apparatus itself. The apparatus information here is information of the information processing apparatus ID and so forth in the data area of the status return command illustrated in FIG. 4.

Determination of the Master/Slave in the System

In the network system described above, when the main power supply to a certain information processing apparatus is made available, the main processor 21 of the information processing controller of the information processing apparatus loads a master/slave manager (hereinafter referred to as MS manager) into the main memory 26 and executes the master/slave manager.

After the MS manager detects that the information processing apparatus in which the MS manager operates is connected to the network 9, it confirms presence of the other information processing apparatus connected to the same network 9. The "connection" or "presence" here represents that the information processing apparatus is connected to the network 9 not only physically but also electrically and functionally.

The information processing apparatus in which the MS manager itself operates is hereinafter referred to as self apparatus, and any other information processing apparatus is referred to as different apparatus. Moreover, the term pertaining apparatus represents the pertaining information processing apparatus.

A method by which the MS manager confirms the presence of a different information processing apparatus connected to the same network 9 is described in the following.

The MS manager produces a software cell that designates the status request command as the DMA command and designates the pertaining information processing apparatus as the sender ID and the response destination ID but does not specify the transmission destination ID. Then, the MS manager transmits the software cell to the network to which the pertaining information processing apparatus is connected and sets a timer for network connection confirmation. The timeout time of the timer is, for example, 10 minutes.

If a different information processing apparatus is connected to the network system, the different apparatus receives the software cell of the status request command and transmits a software cell whose DMA command is the status return command and includes apparatus information of the self apparatus (different apparatus) as the data to an information processing apparatus which is specified by the response destination ID of the received software cell and has issued the status request command. The software cell of the status return command at least includes information for specifying the different apparatus (information processing apparatus ID, information regarding the main processor, information regarding a sub-processor, or the line) and the MS status of the different apparatus.

The MS manager of the information processing apparatus, which has issued the status request command, supervises reception of a software cell of the status return command transmitted from the different apparatus on the network until timeout occurs with the timer for network connection confirmation. As a result, if the status return command representative of the MS status=0 (master apparatus) is received, the MS status in the apparatus information table of the self apparatus is set to 1. Consequently, the pertaining apparatus becomes a slave apparatus.

On the other hand, if no status return command is received within the time until timeout occurs with the timer for network connection confirmation, or if the status return command representative of the MS status=0 (master apparatus) is not received, then the MS status in the apparatus information table of the self apparatus is set to 0. Consequently, the pertaining apparatus becomes a master apparatus.

In short, if a new information processing apparatus is connected to the network 9 in a state wherein no apparatus is connected to the network 9 or in another state wherein a master apparatus does not exist on the network 9, the pertaining apparatus is automatically set as a master apparatus. On the other hand, if a new information processing apparatus is connected to the network 9 in a further state wherein a master apparatus already exists on the network 9, the pertaining apparatus is automatically set as a slave apparatus.

In any of the master apparatus and slave apparatus, the MS manager periodically transmits the status request command to the different apparatus on the network 9 to inquire about the status information to supervise the situation of the different apparatus. As a result, when the connection state of the network 9 undergoes a variation, such as when the main power supply to an information processing apparatus connected to the network 9 is cut or an information processing apparatus is disconnected from the network 9 and consequently the status return command is not returned from the particular different apparatus within a predetermined period of time set for the discrimination in advance, the information is conveyed to a capacity exchange program hereinafter described.

Acquisition of Apparatus Information by the Master Apparatus and a Slave Apparatus If the main processor 21 receives, from the MS manager, a notification of an inquiry about a different apparatus on the network 9 and completion of setting of the MS status of the self apparatus, it executes a capacity exchange program.

The capacity exchange program acquires, if the self apparatus is a master apparatus, apparatus information of all different apparatus connected to the network 9; that is, apparatus information of all slave apparatus.

The acquisition of apparatus information of a different apparatus can be performed such that the DMA command produces and transmits a software cell of the status request command to the different apparatus and then receives a software cell whose DMA command is the status return command and includes apparatus information of the different apparatus as the data from the different apparatus.

The capacity exchange program secures an area for storing apparatus information of all different apparatus (all slave apparatus) connected to the network 9 in the main memory 26 of the self apparatus and stores the information as apparatus information tables of the different apparatus (slave apparatus) similarly to the apparatus information table of the self apparatus as the master apparatus.

In other words, the apparatus information of all of the information processing apparatus connected to the network 9 including the self apparatus is stored as apparatus information tables in the main memory 26 of the master apparatus.

On the other hand, if the self apparatus of the capacity exchange program is a slave apparatus, the capacity exchange program acquires the apparatus information of all of the different apparatus connected to the network 9, that is, the apparatus information of the master apparatus and all of the slave apparatus other than the self apparatus, and records the information processing apparatus IDs and the MS statuses included in the apparatus information into the main memory 26 of the self apparatus.

In other words, in the main memory 26 of each slave apparatus, the apparatus information of the self apparatus is recorded as an apparatus information table, and the information processing apparatus IDs and the MS statuses of all of the master apparatus and the slave apparatus connected to the network 9 other than the self apparatus are recorded as different apparatus information tables.

Further, in any of the master apparatus and the slave apparatus, when the capacity exchange program receives a notification that an information processing apparatus is newly connected to the network 9 from the MS manager as described above, it acquires apparatus information of the information processing apparatus and registers the apparatus information into the main memory 26 as described hereinabove.

It is to be noted that the MS manager and the capacity exchange program may be executed not by the main processor 21 but by any sub-processor 23. Further, the MS manager and the capacity exchange program preferably are resident programs that operate normally while the main power supply to the information processing apparatus is available.

When an Information Processing Apparatus is Disconnected from the Network

In any of the master apparatus and the slave apparatus, if the capacity exchange program is notified from the MS manager that the main power supply to an information processing apparatus connected to the network 9 is disconnected or an information processing apparatus is disconnected from the network 9, it deletes the apparatus information table of the information processing apparatus from the main memory 26 of the self apparatus.

Further, if the information processing apparatus disconnected from the network 9 is the master apparatus, then another master apparatus newly is determined by the following method.

Particularly, for example, each of those information processing apparatus that are not disconnected from the network 9 replaces the information processing apparatus IDs of the self apparatus and the different apparatus into numerical values and compares the information processing apparatus ID of the self apparatus with the information processing apparatus IDs of the different apparatus. If the information processing apparatus ID of the self apparatus exhibits the lowest value among the information processing apparatus that are not disconnected from the network 9, then the slave apparatus changes itself to the master apparatus and sets the MS status to zero. Then, it operates as the master apparatus and acquires and records the apparatus information of all of the different apparatus (slave apparatus) connected to the network 9 into the main memory 26 as described hereinabove.

Distributed Processing Based on Apparatus Information

In order to allow a number of information processing apparatus 1, 2, 3, and 4 connected to the network 9 to operate as a virtual single information processing apparatus 7 as shown at the lower stage of FIG. 5, it is necessary for the master apparatus to grasp an operation of a user and operation states of the slave apparatus.

Figure 7:
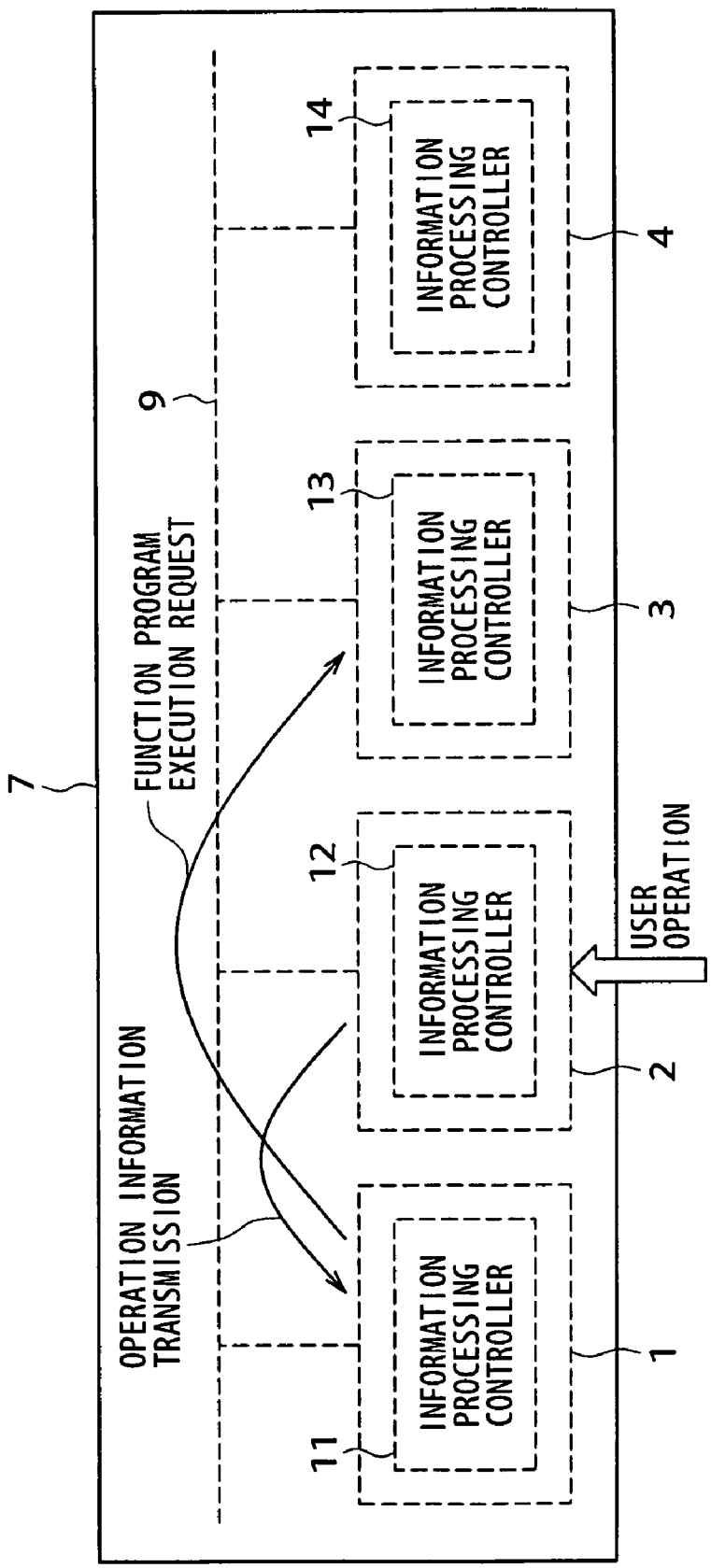
FIG. 7 is a diagrammatic view showing four information processing apparatus in a manner wherein they operate as a virtual single information processing apparatus.

FIG. 7 shows four information processing apparatus in a state wherein they operate as a virtual single information processing apparatus 7. The information processing apparatus 1 acts as the master apparatus while the information processing apparatus 2, 3, and 4 act as slave apparatus A, B, and C, respectively.

When a user operates any of the information processing apparatus connected to the network 9, if the object of the operation is the master apparatus 1, then the operation information is grasped directly by the master apparatus 1. On the other hand, if the object of the operation is a slave apparatus, then the operation information is transmitted from the operated slave apparatus to the master apparatus 1. In other words, irrespective of whether the object of operation of the user is the master apparatus 1 or one of the slave apparatus, the master apparatus 1 always grasps the operation information. Transmission of the operation information is performed, for example, using a software cell whose DMA command is the operation information transmission command.

Thereafter, the main processor 21-1 included in the information processing controller 11 in the master apparatus 1 selects a function program to be executed in accordance with the operation information. In this instance, if necessary, the main processor 21-1 included in the information processing controller 11 in the master apparatus 1 loads the function program from the external recording sections 28-1 and 28-2 of the self apparatus into the main memory 26-1 using the method described hereinabove. However, the function program otherwise may be transmitted from a different information processing apparatus (slave apparatus) to the master apparatus 1.

The function program defines required specifications regarding apparatus such as an information processing apparatus type ID, a processing capacity of the main processor or a sub-processor, a main memory utilization capacity and conditions relating to an external recording section represented as different types of information in FIG. 4.

The main processor 21-1 included in the information processing controller 11 in the master apparatus 1 reads out such requested specifications required by the individual function programs. Further, the main processor 21-1 refers to the apparatus information tables recorded in the main memory 26-1 by the capacity exchange program in advance to read out the apparatus information of the individual information processing apparatus. The apparatus information here signifies the items of information including the item of the information processing apparatus ID and the succeeding items illustrated in FIG. 4 and is information relating to the main processor, sub-processors, main memory, and external recording sections.

The main processor 21-1 included in the information processing controller 11 in the master apparatus 1 successively compares the apparatus information of the information processing apparatus connected to the network 9 with the required specifications necessary for execution of the function program.

Then, for example, if the function program requires a recording function, then the main processor 21-1 included in the information processing controller 11 in the information processing apparatus 1 specifies and extracts only those information processing apparatus, which have a recording function, based on the information processing apparatus type IDs. Further, the main processor 21-1 specifies that one of the slave apparatus that can assure the processing capacity of the main processor or a sub-processor to execute the processing program, the main memory utilization capacity, and conditions regarding an external recording section as an execution request candidate apparatus. Here, if a number of execution request candidate apparatus are specified, then one of the execution request candidate apparatus is specified and selected.

After a slave apparatus to which an execution request is to be issued is specified, the main processor 21-1 included in the information processing controller 11 in the master apparatus 1 updates the apparatus information table with regard to the specified slave apparatus recorded in the main memory 26-1 included in the information processing controller 11 in the self apparatus.

Further, the main processor 21-1 included in the information processing controller 11 in the information processing apparatus 1 produces a software cell, which includes the load command and the kick command as the DMA commands, and sets information of a necessary sub-processor and the sandbox size (refer to FIG. 3) regarding the function program to the cell interface of the software cell. Then, the main processor 21-1 transmits the resulting software cell to the slave apparatus, which is requested to execute the function program.

The slave apparatus requested to execute the function program executes the function program and updates the apparatus information table of the self apparatus. In this instance, if necessary, the main processor 21 included in the information processing controller in the slave apparatus loads the function program and a sub-processor program which operates cooperatively with the function program from an external recording section 28 of the self apparatus into the main memory 26 using the method described hereinabove.

The system may be configured such that, if the necessary function program is not recorded in any of the external recording sections 28 of the slave apparatus requested to execute the function program and the sub-processor program which operates cooperatively with the function program, then a different information processing apparatus transmits the function program or the sub-processor program to the slave apparatus requested to execute the function program.

The sub-processor program may be executed by a different information processing apparatus making use of the load command and the kick command described hereinabove.

After the execution of the function program comes to an end, the main processor 21 included in the information processing controller in the slave apparatus having executed the function program transmits an execution end notification to the main processor 21-1 included in the information processing controller in the slave apparatus, and updates the apparatus information table of the self apparatus. The main processor 21-1 included in the information processing controller 11 in the master apparatus 1 receives the end notification and updates the apparatus information table of the slave apparatus having executed the function program.

The main processor 21-1 included in the information processing controller 11 in the master apparatus 1 possibly may select the self apparatus as an information processing apparatus, which can execute the function program, from a result of the reference to the apparatus information tables of the self apparatus and the different apparatus. In this instance, the master apparatus 1 executes the function program.

Distributed processing where a user operates, in the example illustrated in FIG. 7, the slave apparatus A (information processing apparatus 2) and the different slave apparatus B (information processing apparatus 3) executes a function program in response to the operation is described with reference to FIG. 8.

Figure 8:
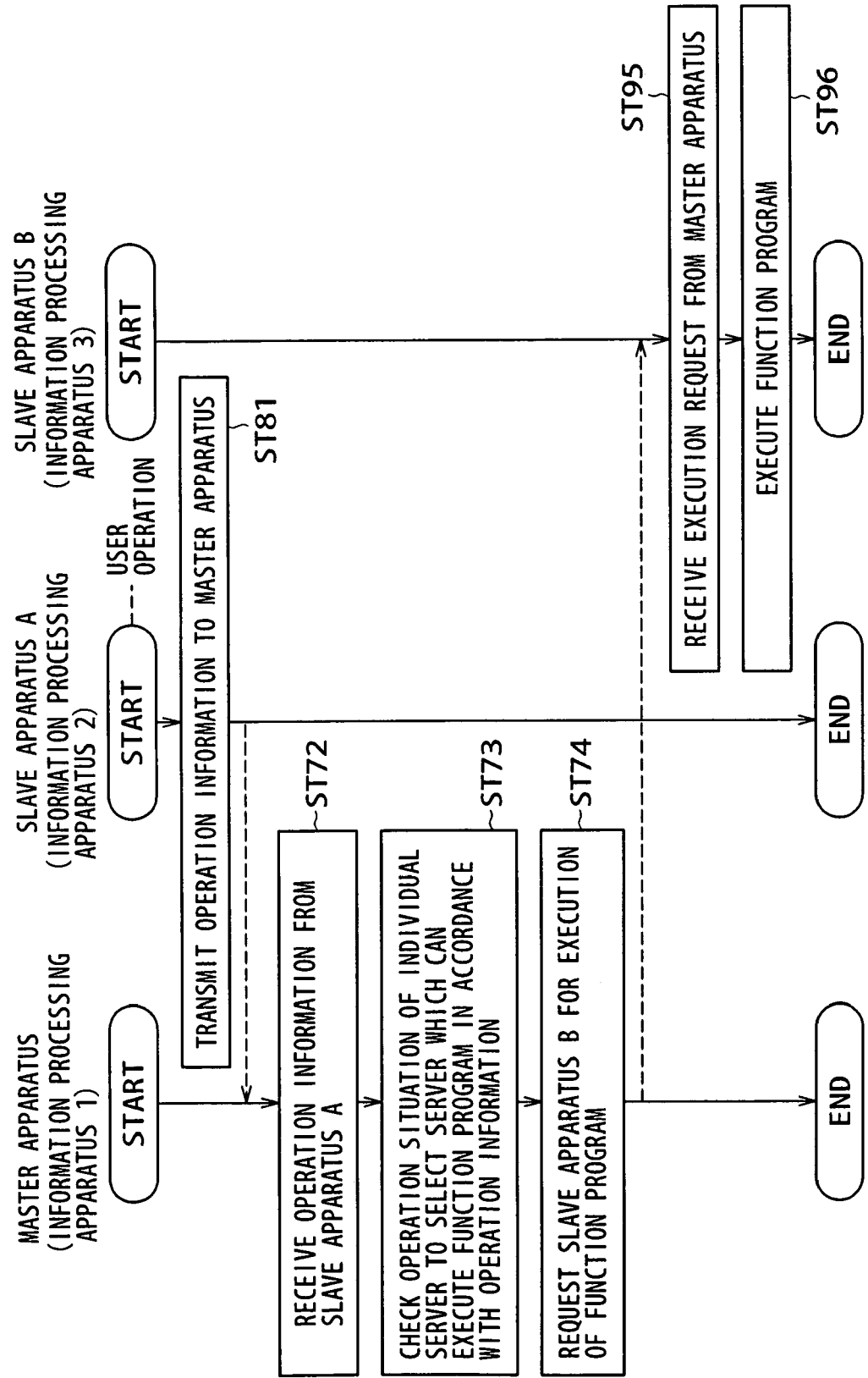
FIG. 8 is a diagrammatic view illustrating an example of distributed processing by the system shown in FIG. 7.

In the example illustrated in FIG. 8, when the user operates the slave apparatus A, distributed processing of the entire network system including the slave apparatus A is started, and the slave apparatus A first transmits operation information to the master apparatus 1 at step 81.

The master apparatus 1 receives the operation information at step 72 and checks the operation states of the information processing apparatus from the apparatus information tables of the self apparatus and the different apparatus recorded in the main memory 26-1 of the self apparatus to select an information processing apparatus, which can execute a function program corresponding to the received operation information at step 73. In the example illustrated in FIG. 8, the slave apparatus B is selected.

Then, the master apparatus 1 issues a request for execution of the function program to the selected slave apparatus B at step 74.

The slave apparatus B receives the execution request at step 95 and executes the function program whose execution is requested at step 96.

In this manner, if a user operates only one of the information processing apparatus, then it can cause the multiple information processing apparatus 1, 2, 3, and 4 to operate as a virtual single information processing apparatus 7 without operating any other one of the information processing apparatus.

Particular Examples of the Information Processing Apparatus and the System

Figure 9:
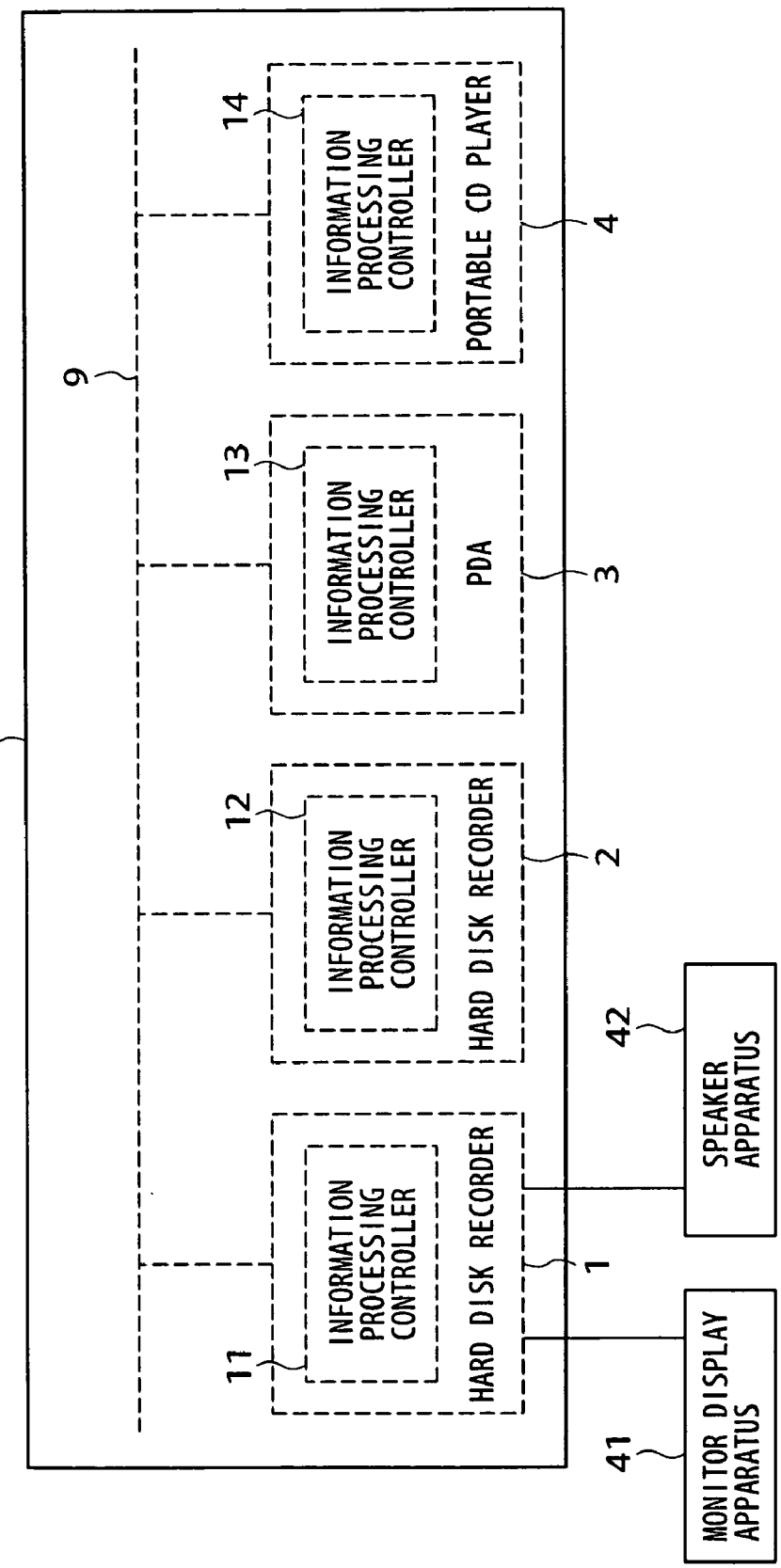
FIG. 9 is a diagrammatic view showing a particular example of information processing apparatus and a system.

Each of the information processing apparatus 1, 2, 3 and 4 connected to each other through the network 9 basically may have any configuration only if information processing is performed by such an information processing controller 11, 12, 13 or 14 as described hereinabove. FIG. 9 shows an example of a configuration of the information processing apparatus.

Figure 10:
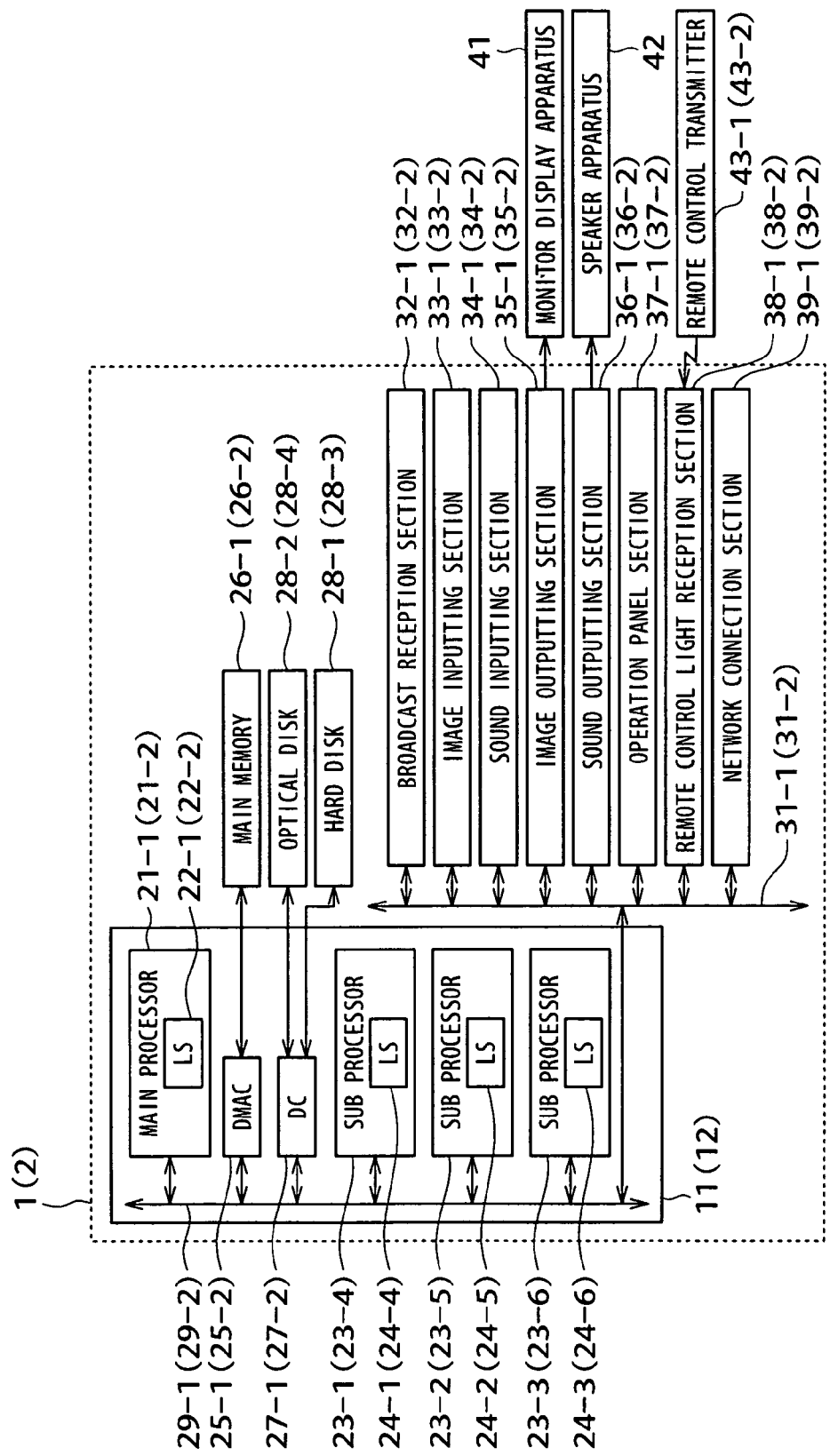
FIG. 10 is a block diagram showing a hardware configuration of a hard disk recorder shown in FIG. 9.

In the example shown in FIG. 9, the information processing apparatus 1 which includes the information processing controller 11 is a hard disk recorder. FIG. 10 shows a hardware configuration of the hard disk recorder shown in FIG. 9. Referring to FIG. 10, the information processing apparatus 1 shown includes, as the hardware configuration thereof, a built-in hard disk serving as the external recording section 28-1 shown in FIG. 1. The information processing apparatus 1 further includes the external recording section 28-2 shown in FIG. 2 into which an optical disk such as a DVD±R/RW, a CD±R/RW, a Bluray-Disc (registered trademark) and so forth can be loaded. The information processing apparatus 1 further includes a broadcast reception section 32-1, an image inputting section 33-1, a sound inputting section 34-1, an image outputting section 35-1, a sound outputting section 36-1, an operation panel section 37-1, a remote control light reception section 38-1 and a network connection section 39-1 connected to a bus 31-1 which is in turn connected to the bus 29-1 of the information processing controller 11.

The broadcast reception section 32-1, image inputting section 33-1 and sound inputting section 34-1 receive a broadcasting signal or an image signal and a sound signal from the outside of the information processing apparatus 1, convert the received signal or signals into digital data of a predetermined format, and signals the digital data to the bus 31-1 so as to be processed by the information processing controller 11. The image outputting section 35-1 and the sound outputting section 36-1 process image data and sound data signaled from the information processing controller 11 to the bus 31-1 and signal the image data and the sound data as they are or after converted into analog signals to the outside of the information processing apparatus 1. The remote control light reception section 38-1 receives a remote control infrared signal from a remote control transmitter 43-1.

As seen in FIGS. 9 and 10, a monitor display apparatus 41 and a speaker apparatus 42 are connected to the image outputting section 35-1 and the sound outputting section 36-1 of the information processing apparatus (hard disk recorder) 1, respectively.

Moreover, the information processing apparatus 2 which includes the information processing controller 12 shown in FIG. 9 is a hard disk recorder and is configured similarly to the information processing apparatus 1 as seen in FIG. 10 in which reference numerals are applied in parentheses. However, a monitor display apparatus and a speaker apparatus are not connected to the information processing apparatus (hard disk recorder) 2 as seen in FIG. 9.

Figure 11:
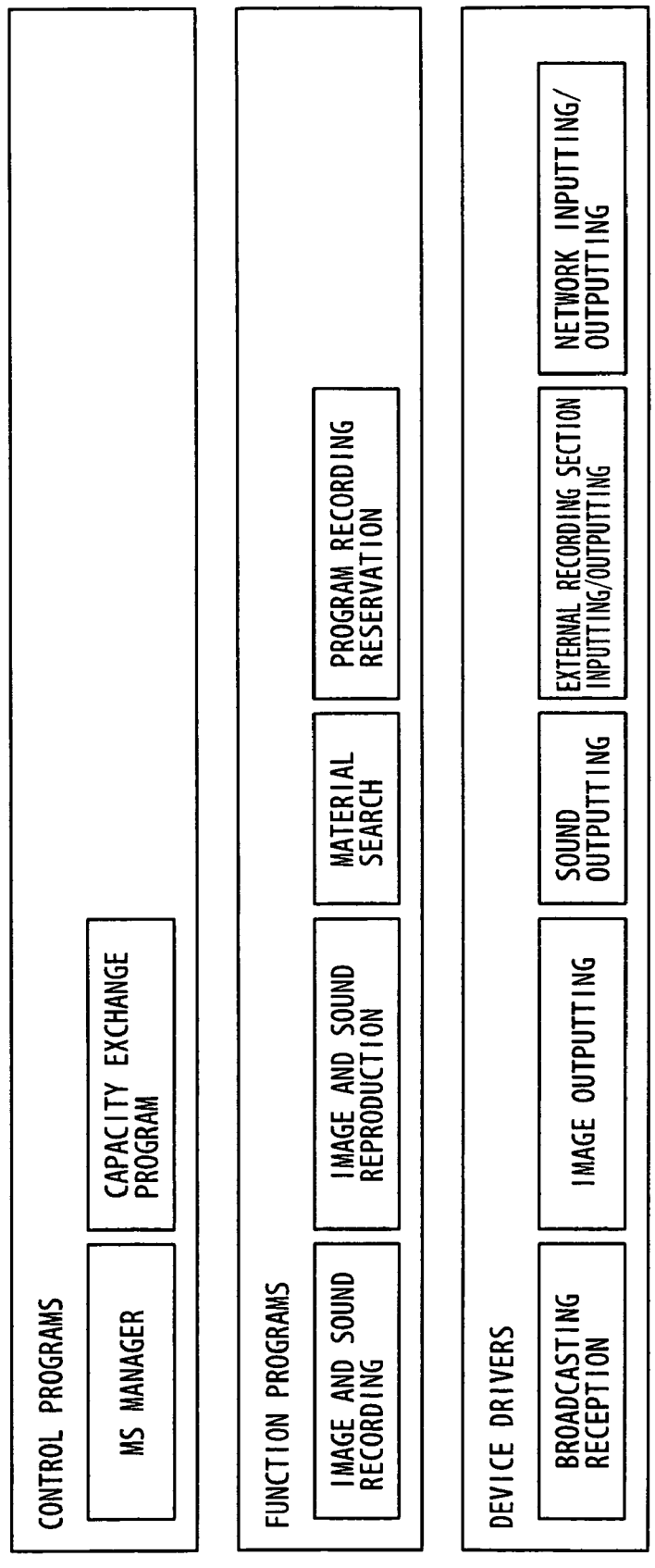
FIG. 11 is a diagrammatic view showing a software configuration of the hard disk recorder shown in FIG. 9.

The information processing apparatus (hard disk recorders) 1 and 2, that is, the information processing controllers 11 and 12, include, as the software configuration shown in FIG. 11, the MS manager and the capacity exchange program as the control programs. Further, the information processing controllers 11 and 12 include programs for image signal and sound recording, image and sound reproduction, material search and program recording reservation as the function programs. Furthermore, the information processing controllers 11 and 12 include programs for broadcast reception, image outputting, sound outputting, external recording section inputting/outputting and network inputting/outputting as the device drivers.

Figure 12:
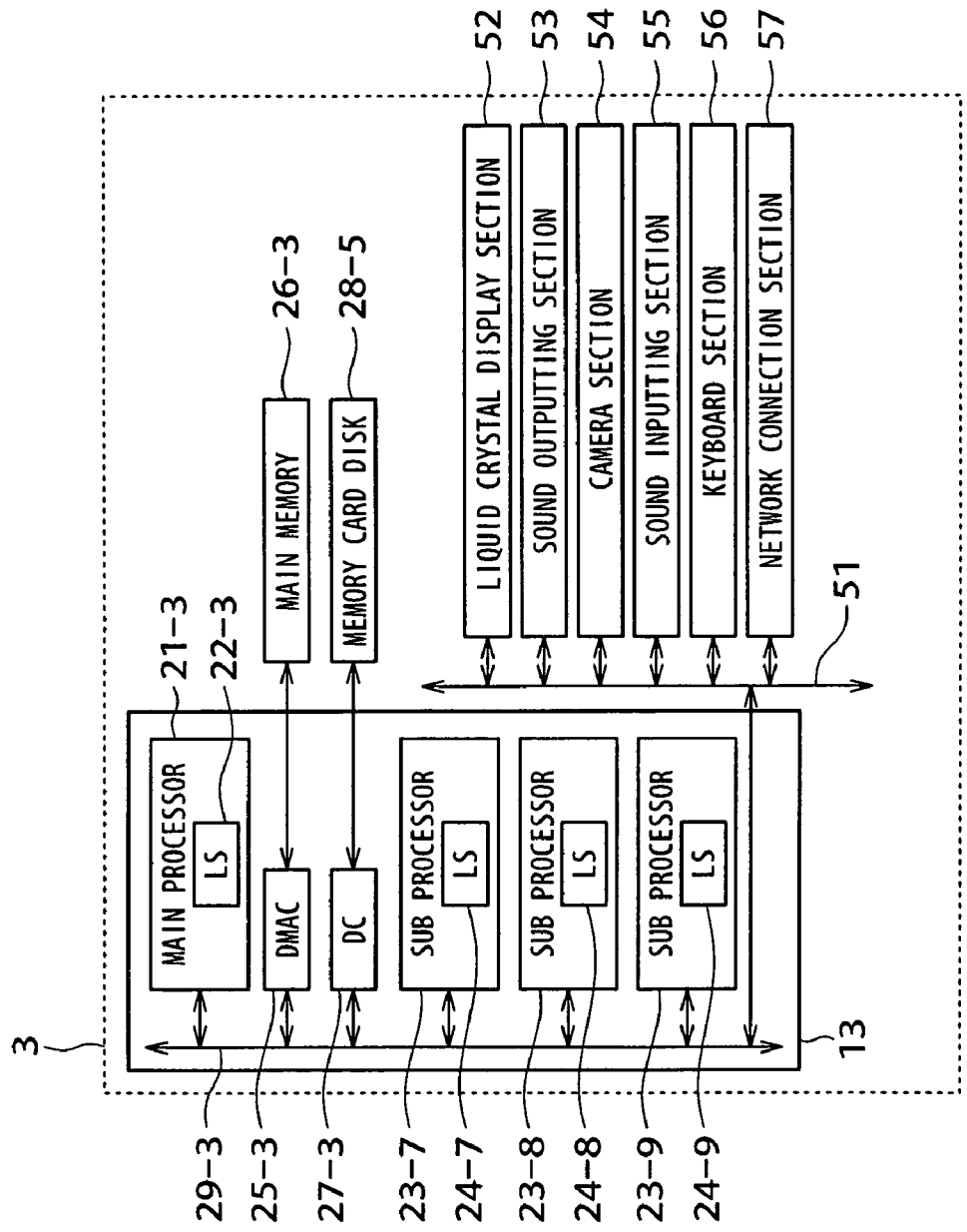
FIG. 12 is a block diagram showing a hardware configuration of a PDA shown in FIG. 9.

An example of the information processing apparatus 3 in the example of FIG. 9 which includes the information processing controller 13 is a PDA (Personal Digital Assistant). FIG. 12 shows a hardware configuration of the information processing apparatus 3 formed as a PDA. Referring to FIG. 12, in the example shown, the information processing apparatus 3 includes the external recording section 28-5 shown in FIG. 1 into which a memory card disk can be loaded. The information processing apparatus 3 further includes a liquid crystal display section 52, a sound outputting section 53, a camera section 54, a sound inputting section 55, a keyboard section 56 and a network connection section 57 connected to a bus 51 which is, in turn, connected to the bus 29-3 of the information processing controller 13.

It is to be noted that the information processing controller 13 whose internal configuration is not shown in FIG. 1 includes a main processor 21-3, sub-processors 23-7, 23-8 and 23-9, a direct memory access controller (DMAC) 25-3, a disk controller (DC) 27-3, and a bus 29-3. The main processor 21-3 includes a local storage (LS) 22-3, and the sub-processors 23-7, 23-8 and 23-9 include local storages (LS) 27-7, 24-8 and 24-9, respectively.

Figure 13:
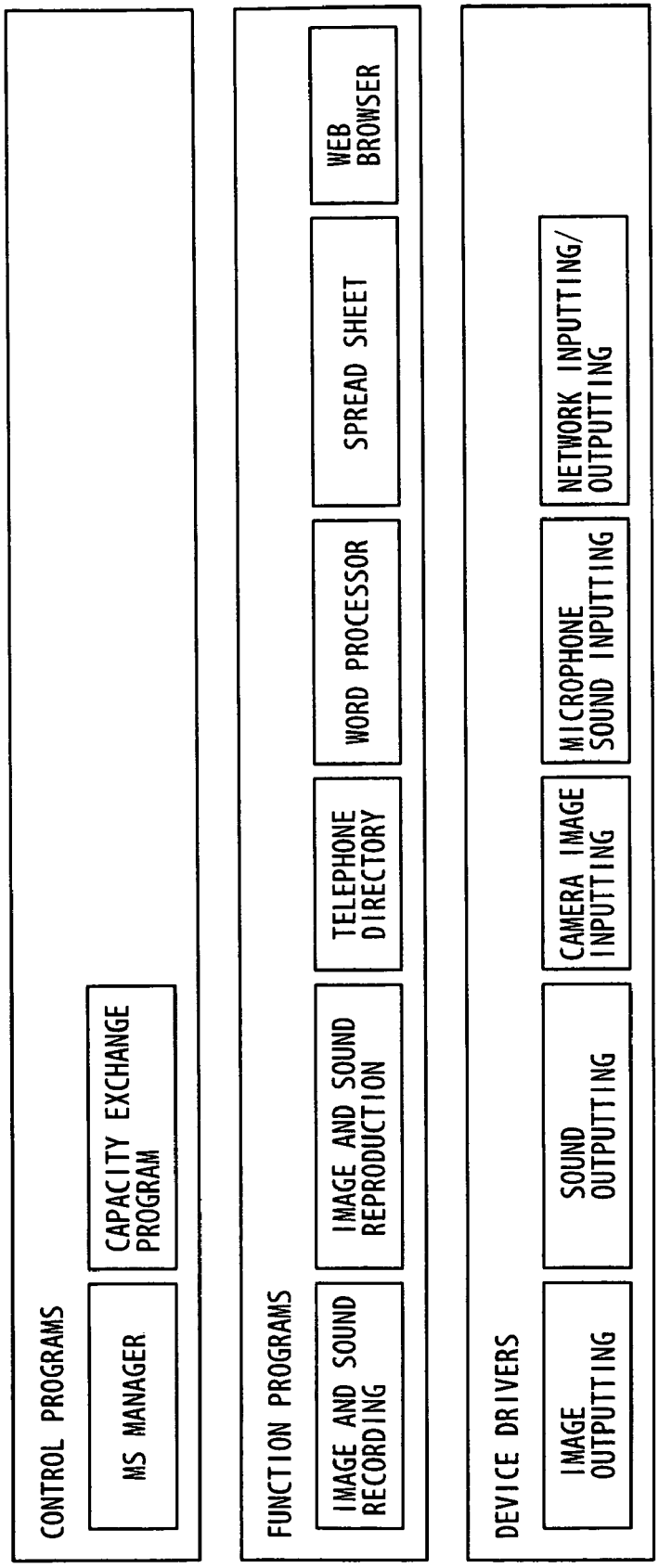
FIG. 13 is a diagrammatic view showing a software configuration of the PDA shown in FIG. 9.

FIG. 13 shows a software configuration of the information processing apparatus (PDA) 3; that is, the information processing controller 13. Referring to FIG. 13, the information processing controller 13 includes the MS manager and the capacity exchange program as the control programs. Further, the information processing controller 13 includes programs for image and sound recording, image and sound reproduction, telephone directory, word processor and spreadsheet as the function programs, and includes a Web browser as well. Furthermore, the information processing controller 13 includes programs for image outputting, sound outputting, camera image inputting, microphone sound inputting and network inputting/outputting as the device drivers.

Figure 14:
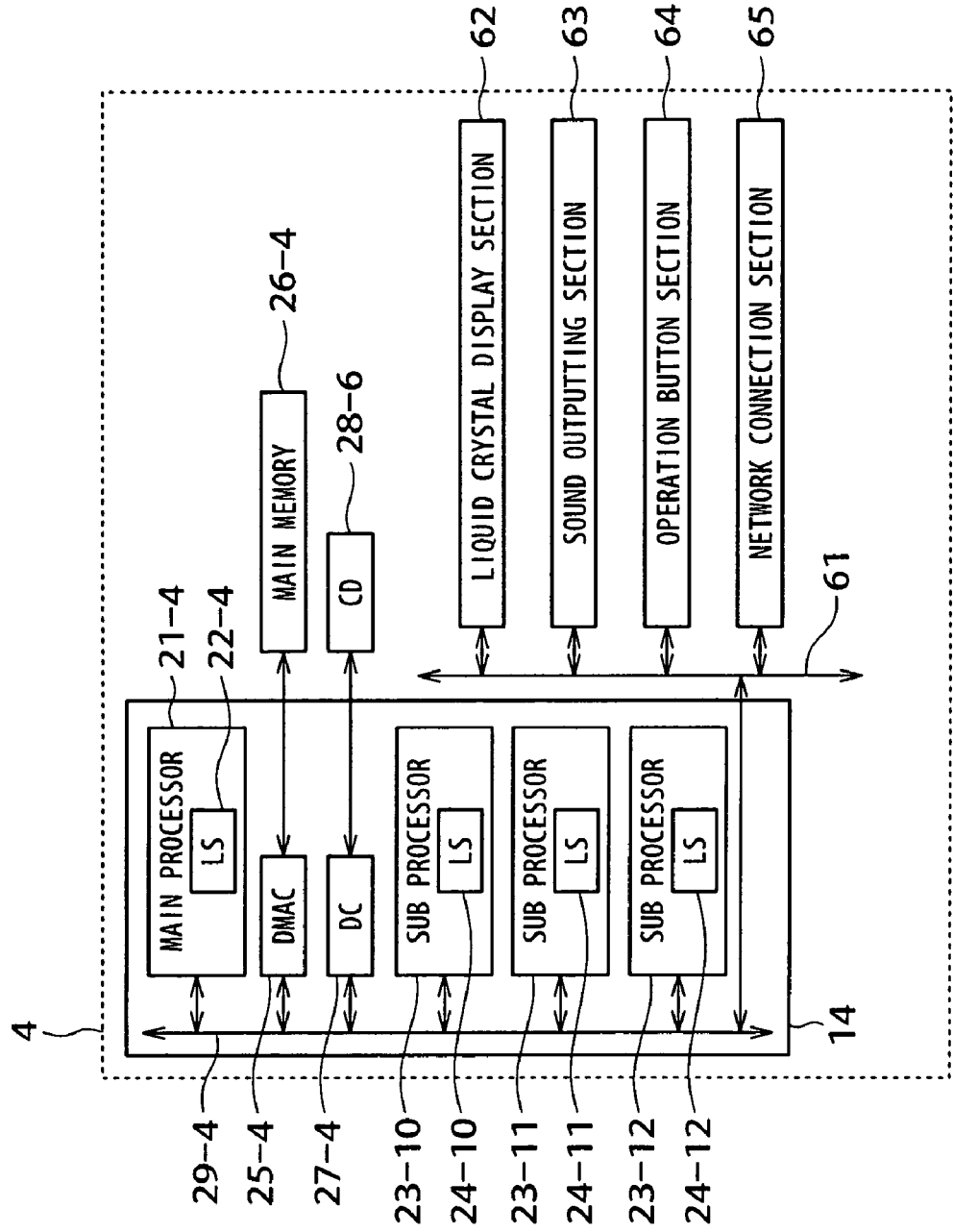
FIG. 14 is a block diagram showing a hardware configuration of a portable CD player shown in FIG. 9.

The information processing apparatus 4 in the example of FIG. 9 which includes the information processing controller 14 is a portable CD player. FIG. 14 shows a hardware configuration of a portable CD player. Referring to FIG. 14, the portable CD player includes the external recording section 28-6 shown in FIG. 1 into which a CD (Compact Disc) can be loaded. The portable CD player further includes a liquid crystal display section 62, a sound outputting section 63, an operation button section 64 and a network connection section 65 connected to a bus 61 which is, in turn, connected to the bus 29-4 of the information processing controller 14.

It is to be noted that the information processing controller 14 whose internal configuration is not shown in FIG. 1 includes a main processor 21-4, sub-processors 23-10, 23-11 and 23-12, a direct memory access controller (DMAC) 25-4, a disk controller (DC) 27-4 and a bus 29-4. The main processor 21-4 includes a local storage (LS) 22-4, and the sub-processors 23-10, 23-11 and 23-12 include local storages (LS) 24-10, 24-11 and 24-12, respectively.

Figure 15:
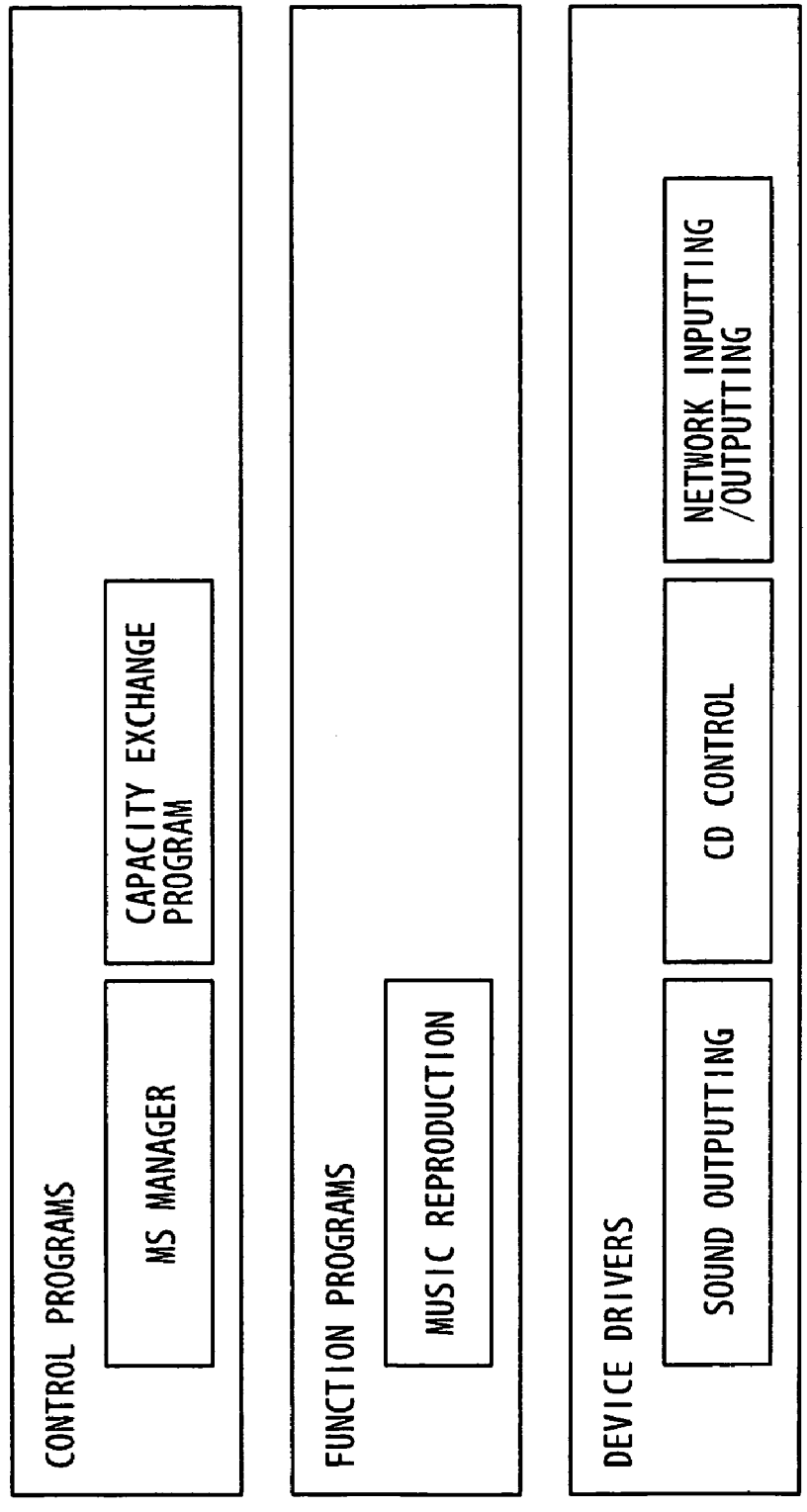
FIG. 15 is a diagrammatic view showing a software configuration of the portable CD player shown in FIG. 9.

FIG. 15 shows a software configuration of the information processing apparatus (portable CD player) 4, that is, the information processing controller 14. Referring to FIG. 15, the information processing controller 14 includes the MS manager and the capacity exchange program as the control programs. Further, the information processing controller 14 includes a program for music reproduction as the function program and includes programs for sound outputting, CD control and network inputting/outputting as the device drivers.

In the network system having such a configuration as described above with reference to FIG. 9, the information processing apparatus 1, 3 and 4 are connected to the network 9, the information processing apparatus 1 is set as the master apparatus (MS status=0) and the information processing apparatus 3 and 4 are set as slave apparatus (MS status=1).

If, in this state, the information processing apparatus 2 is newly connected to the network 9, then the MS manager which is executed in the main processor 21-2 included in the information processing controller 12 in the information processing apparatus 2 inquires the other information processing apparatus 1, 3 and 4 about the MS status and recognizes that the information processing apparatus 1 always exists as the master apparatus. Thus, the MS manager sets the self apparatus (information processing apparatus 2) as a slave apparatus (MS status=1). Meanwhile, the information processing apparatus 1 set as the master apparatus collects the apparatus information of the apparatus including the newly-added information processing apparatus 2 and updates the apparatus information tables in the main memory 26-1 based on the collected apparatus information.

Operation of the network system of FIG. 9 when, in this state, the user operates the information processing apparatus 3, which is a slave apparatus, for recording reservation of a broadcasting program for two hours is described below.

In this instance, the information processing apparatus 3 which is a slave apparatus accepts inputting of recording reservation information including information of recording start time, recording end time, a recording object broadcast channel and a recording picture quality, and produces a software cell including the recording reservation information and the recording reservation command as the DMA command. Then, the information processing apparatus 3 transmits the produced software cell to the information processing apparatus 1 which is the master apparatus.

The main processor 21-1 included in the information processing controller 11 in the information processing apparatus 1 which receives the software cell whose DMA command is the recording reservation command reads out the recording reservation command and refers to the apparatus information tables in the main memory 26-1 to specify an information processing apparatus which can execute the recording reservation command.

First, the main processor 21-1 reads out the information processing apparatus type IDs of the information processing apparatus 1, 2, 3 and 4 included in the apparatus information tables to extract those information processing apparatus which can execute a function program corresponding to the recording reservation command. Here, the information processing apparatus 1 and 2 having the information processing apparatus type ID indicative of the recording function are specified as candidate apparatus, while the information processing apparatus 3 and 4 are excepted from candidate apparatus.

The main processor 21-1 included in the information processing controller 11 in the information processing apparatus 1 refers to the apparatus information tables to read out information regarding the apparatus such as the processing capacities of the main processors and sub-processors and information regarding the main memories of the information processing apparatus 1 and 2, and discriminates whether or not the information processing apparatus 1 and 2 satisfy the required specifications necessary for execution of a function program corresponding to the recording reservation command. It is assumed here that both of the information processing apparatus 1 and 2 satisfy the required specifications necessary for execution of a function program corresponding to the recording reservation command.

Further, the main processor 21-1 refers to the apparatus information tables to read out the information regarding external recording sections of the information processing apparatus 1 and 2, and discriminates whether or not the free capacities of the external recording sections satisfy the capacity necessary for execution of the recording reservation command. Since the information processing apparatus 1 and 2 are hard disk recorders, the differences between the total capacities and the used capacities of the external recording sections 28-1 and 28-3 individually correspond to the free capacities.

In this instance, it is assumed that the free capacity of the external recording section 28-1 of the information processing apparatus 1 is 10 minutes when it is converted into a recording period of time and the free capacity of the hard disk 28-3 of the information processing apparatus 2 is 20 hours when it is converted into a recording period of time.

In this instance, the main processor 21-1 included in the information processing controller 11 in the information processing apparatus 1 which is the master apparatus specifies the information processing apparatus which can secure the free capacity for two hours necessary for execution of the recording reservation command as a slave apparatus of a destination of an execution request.

As a result, only the information processing apparatus 2 is selected as the execution request destination slave apparatus, and the main processor 21-1 included in the information processing controller 11 in the information processing apparatus 1 which is the master apparatus transmits the recording reservation command including the recording reservation information transmitted from the information processing apparatus 3 operated by the user to the information processing apparatus 2 to request the information processing apparatus 2 for recording reservation of the broadcast program for two hours described hereinabove.

Then, the main processor 21-2 included in the information processing controller 12 in the information processing apparatus 2 analyzes the recording reservation command and loads a function program necessary for recording from the hard disk 28-3, which is an external recording section, into the line memory 26-2. Then, the main processor 21-2 executes recording in accordance with the recording reservation information. As a result, image and sound data of the broadcast program for two hours reserved for recording are recorded on the hard disk 28-3 of the information processing apparatus 2.

In this manner, in the network system shown in FIG. 9, the user can cause the multiple information processing apparatus 1, 2, 3 and 4 to operate as a virtual single information processing apparatus 7 by operating only one of the information processing apparatus without operating any other one of the information processing apparatus.

Incidentally, depending upon the connection situation of the network, communication speeds between information processing apparatus may exhibit some differences. For example, if communication or request for execution of a function program or a sub-processor program is performed between information processing apparatus whose communication is very low, then although the network system includes a number of information processing apparatus connected to each other and can perform distributed processing, the processing speed of the entire system intended by the user may not be achieved.

Thus, if the communication speeds between information processing apparatus of a network system are managed and distributed processing is performed in compliance with the communication speeds, then the processing speed of the entire system can be further raised. This is achieved by an embodiment of the present invention described below.

Figure 16:
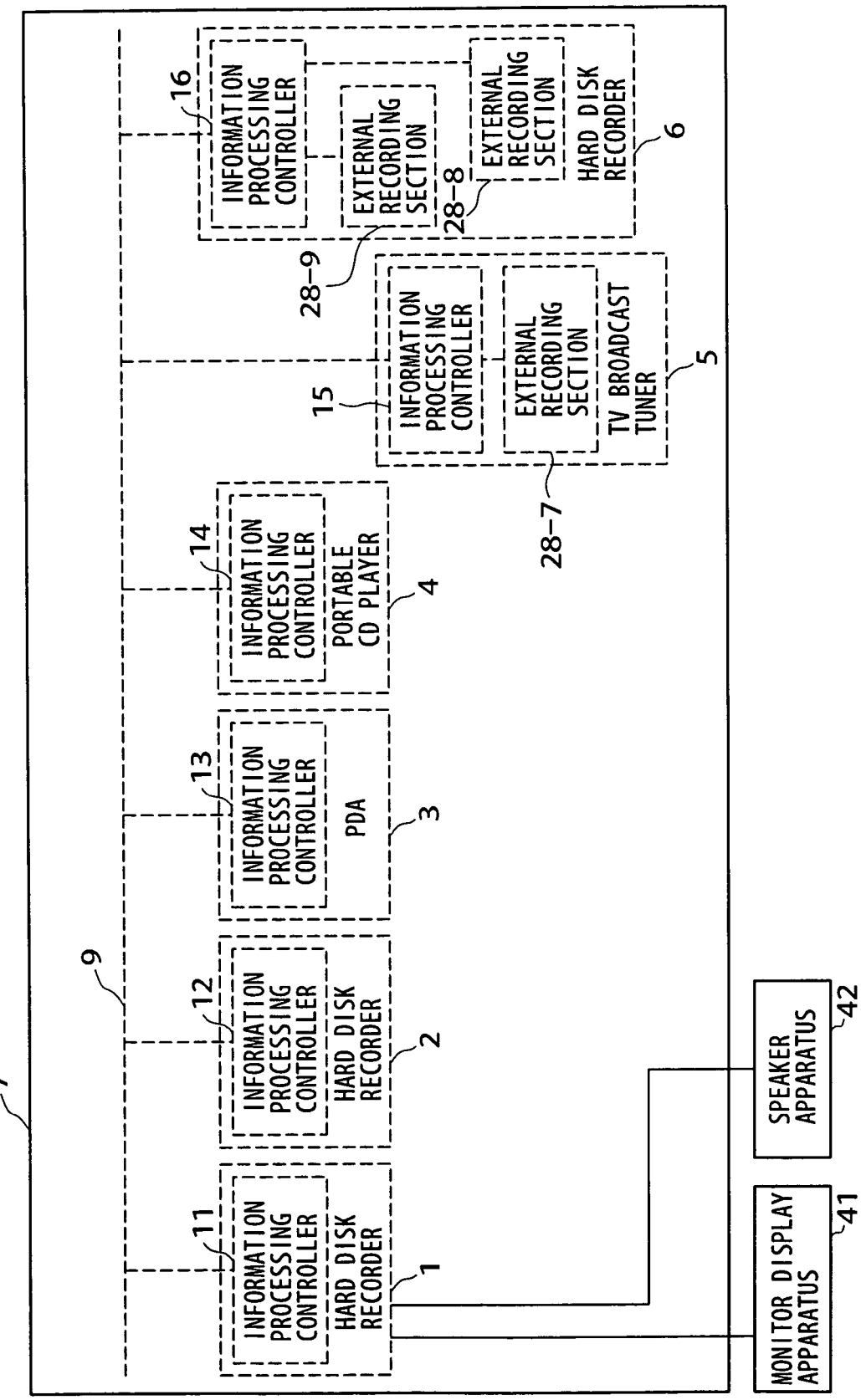
FIG. 16 is a block diagram illustrating a particular example of distributed processing complying with the communication speed.

FIG. 16 shows a network system configured such that the network system described hereinabove with reference to FIG. 9 additionally includes information processing apparatus 5 and 6. The information processing apparatus 5 is a TV broadcast tuner capable of receiving a TV broadcast while the information processing apparatus 6 is a hard disk recorder similar to the information processing apparatus 1 or 2.

Figure 17:
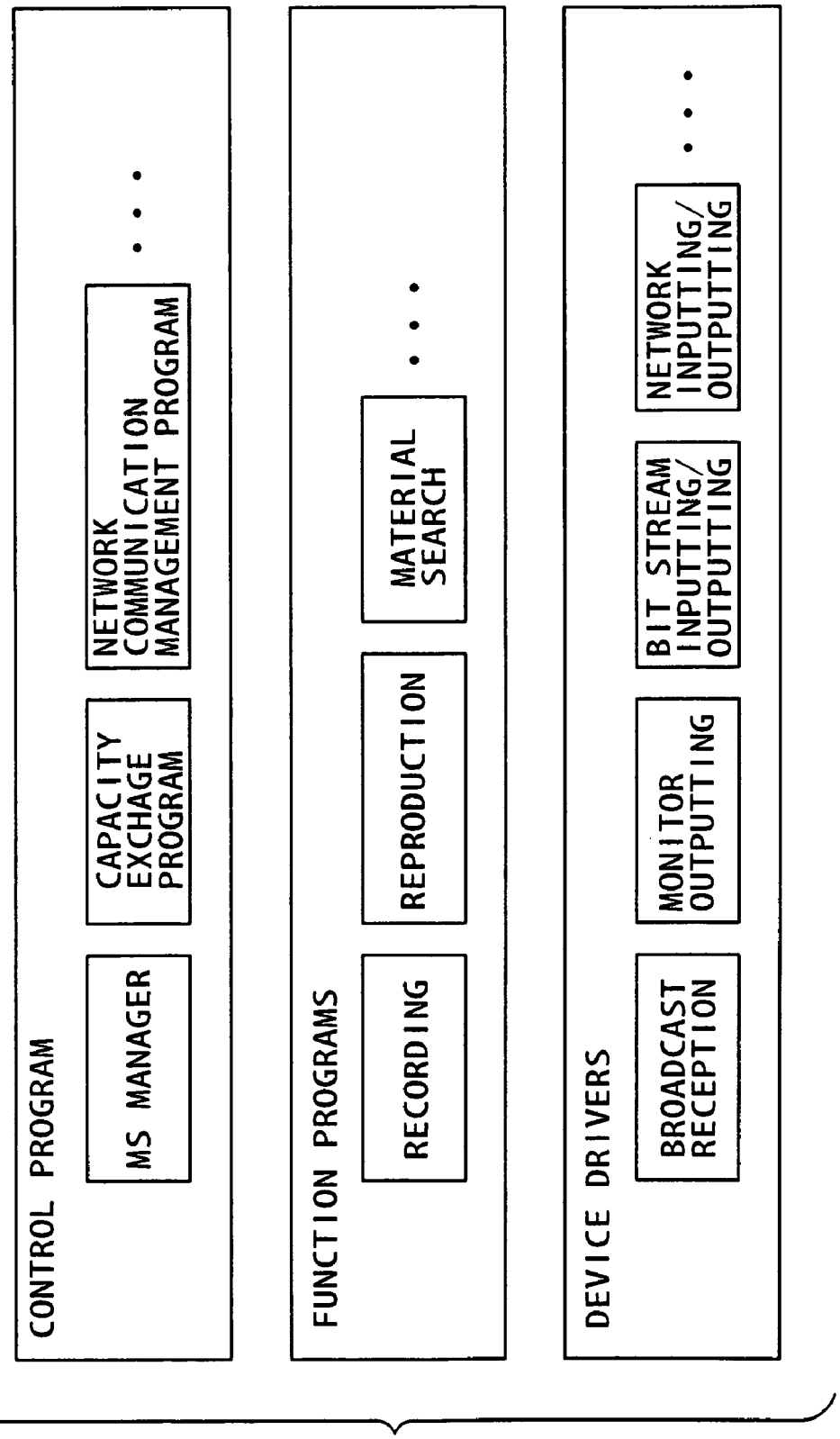
FIG. 17 is a view showing an example of a software configuration of an information processing controller in a network system wherein distributed processing complying with the communication speed is performed.

A configuration of software stored in the main memory of the information processing controller in each of the information processing apparatus included in the network system of FIG. 16 is shown in FIG. 17. When compared with the software configuration described hereinabove with reference to FIG. 6, the software configuration shown in FIG. 17 additionally includes a network communication management program as a program categorized into the control program.

The network communication management program is executed after the MS manager or the capacity exchange program is executed. Preferably, the network communication management program is a resident program which normally operates while the main power supply is available to the information processing apparatus similarly to the MS manager and the capacity exchange program.

Figure 18:
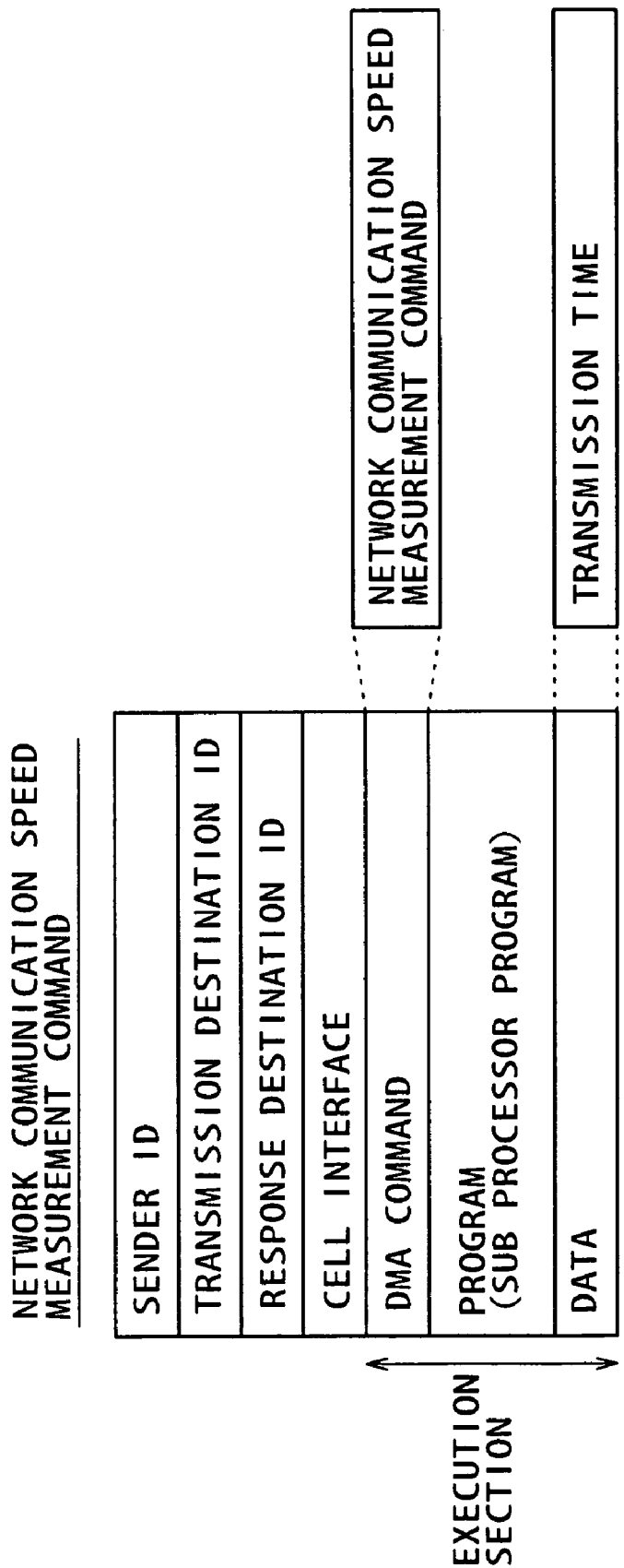
FIG. 18 is a view showing a software cell where a DMA command is a network communication speed measurement command.

Irrespective of whether the information processing apparatus in which the network communication management program operates is the master apparatus or a slave apparatus, the network communication management program transmits a software cell as a network communication speed measurement command illustrated in FIG. 18 periodically to all of the information processing apparatus included in the same network. The network communication management program includes, as the data thereof, transmission time Ts of the software cell, and the size of the software cell as the network communication speed measurement command is Cs and fixed. The information processing apparatus which receives the network communication speed measurement command determines the communication speed from reception time Tr in accordance with the communication speed=$Cs/(Tr-Ts)$.

Figure 19:
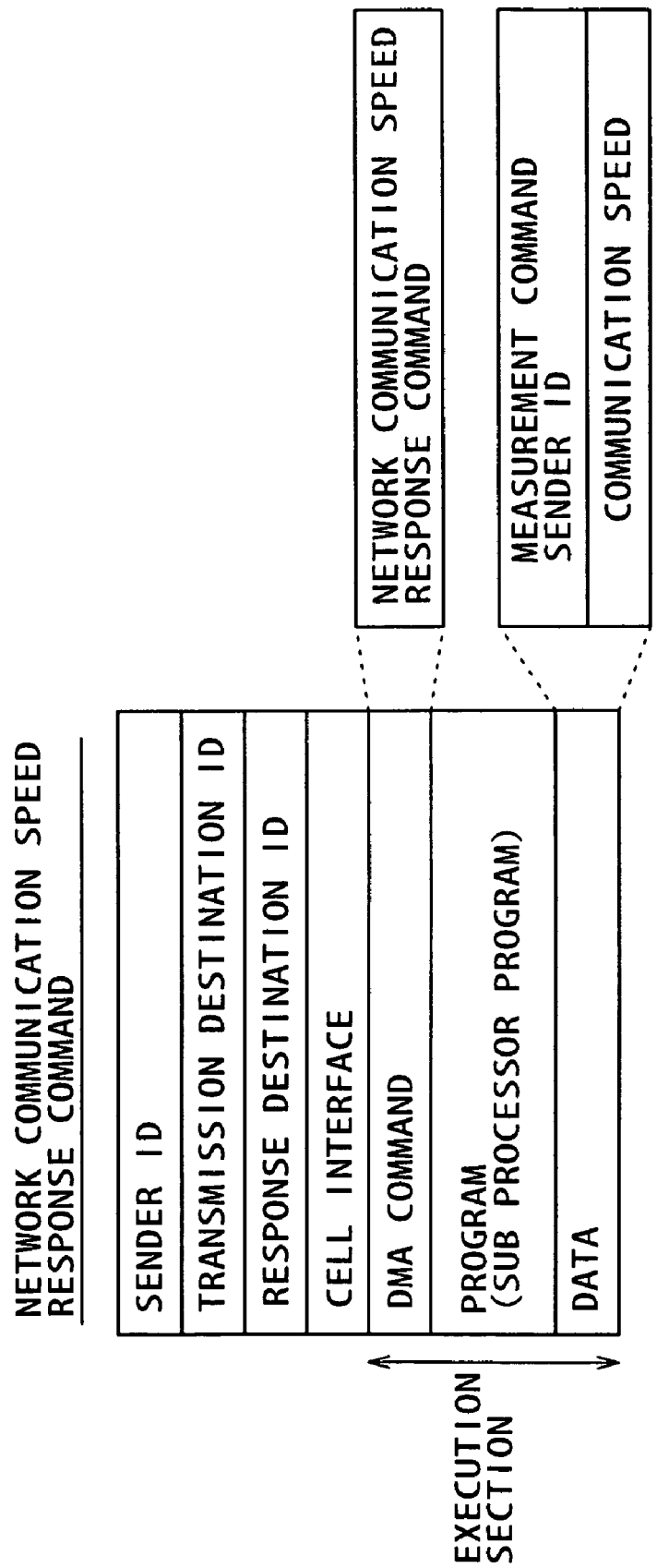
FIG. 19 is a view showing a software cell where a DMA command is a network communication speed response command.

Then, the information processing apparatus transmits a software cell as a network communication speed response command which includes the determined communication speed as the data thereof to the master apparatus. The network communication speed response command is illustrated in FIG. 19 and includes, as the data thereof, a measurement command sender ID. The measurement command sender ID represents the information processing apparatus ID of the information processing apparatus from which the network communication speed measurement command is transmitted to the self apparatus. As the network communication management program operates in such a manner as described above in all of the information processing apparatus included in the network, all communication speeds between the information processing apparatus are collected by the master apparatus.

The network communication management program in the master apparatus stores all communication speeds in the network as a network communication management table shown in FIG. 20. Referring to FIG. 20, the information processing apparatus ID of the information processing apparatus 1 is stored in the apparatus 1. Thus, it can be seen from FIG. 20 that the communication speed from the information processing apparatus 1 to the information processing apparatus 2 is 300.

Further, as described hereinabove, the network communication management program is a resident program, and since the network communication speed measurement command is periodically transmitted to all of the different information processing apparatus and also the network communication speed response command corresponding to the network communication speed measurement command is transmitted to the master apparatus, the network communication speed management speed is always updated. Consequently, the latest communication speed information is managed.

It is assumed that operation for recording reservation of a broadcasting program for 2 hours is performed on the information processing apparatus (PDA) 3, which is a slave apparatus, by the user in the state illustrated in FIG. 16.

In this instance, the information processing apparatus (PDA) 3 as a slave apparatus accepts an input of recording reservation information such as recording start time, recording end time, a recording object broadcasting channel and recording picture quality from the user. Then, the information processing apparatus 3 produces a software cell including the recording reservation information and the recording reservation command as the DMA command and transmits the software cell to the information processing apparatus 1 which is the master apparatus.

The main processor 21-1 included in the information processing controller 11 in the information processing apparatus 1 which receives the software cell whose DMA command is the recording reservation command reads out the recording reservation command and refers to the apparatus information table in the main memory 26-1 to specify an information processing apparatus which can execute the recording reservation command.

In particular, the main processor 21-1 first reads out the information processing apparatus type IDs of the information processing apparatus 1, 2, 3, 4, 5 and 6 included in the apparatus information table to extract those information processing apparatus which can execute the recording reservation command. Here, the information processing apparatus 1, 2 and 6 having the information processing apparatus type ID indicating the recording function are specified as candidate apparatus while the information processing apparatus 3, 4 and 5 are excepted from such candidate apparatus.

Then, the main processor 21-1 included in the information processing controller 11 in the information processing apparatus 1 as the master apparatus refers to the apparatus information table to read out information regarding the apparatus such as the processing capacities of the main processor or sub-processor of the information processing apparatus 1, 2 and 6 and information regarding the main memory and discriminates whether or not the information processing apparatus 1, 2 and 6 satisfy required specifications necessary for execution of the recording reservation command. Here, it is assumed that all of the information processing apparatus 1, 2 and 6 satisfy the required specifications necessary for execution of the recording reservation function.

Further, the main processor 21-1 refers to the apparatus information table to read out information regarding the external recording sections of the information processing apparatus 1, 2 and 6 and discriminates whether or not the free capacity of the external recording sections satisfies the capacity necessary for execution of the recording reservation command. Since all of the information processing apparatus 1, 2 and 6 are hard disk recorders, the differences between the total capacities and the used capacities of the hard disks 28-1, 28-2 and 28-3 correspond to the free capacities of the information processing apparatus 1, 2 and 6, respectively.

In this instance, it is assumed that the free capacity of the hard disk 28-1 of the information processing apparatus 1 is 10 minutes when it is converted into a recording period of time, the free capacity of the hard disk 28-3 of the information processing apparatus 2 is 20 hours when it is converted into a recording period of time, and the free capacity of the hard disk 28-8 of the information processing apparatus 6 is 20 hours when it is converted into a recording period of time.

In this instance, the main processor 21-1 included in the information processing controller 11 in the information processing apparatus 1 serving as the master apparatus specifies an information processing apparatus which can assure a free capacity of 2 hours necessary for execution of the recording reservation command as an execution request destination slave apparatus. Thus, the information processing apparatus 2 and 6 are selected as candidates for the execution request destination slave apparatus.

For each of the function programs, required specifications relating to an information processing apparatus represented as such various kinds of information as illustrated in FIG. 4 and required for each execution period of the function program are prescribed. The main processor 21-1 included in the information processing controller 11 in the information processing apparatus 1 successively compares the required specifications and the apparatus information of the individual information processing apparatus with each other as described hereinabove to specify an execution request destination slave apparatus. For each of the function programs, a necessary sub-processor number is defined depending upon the communication speed illustrated in FIG. 21, and the main processor can read out the necessary sub-processor number depending upon the communication speed from the pertaining function program. FIG. 21 signifies that, for example, the function program necessary to execute the recording reservation command is a function program represented by ID=1. In this instance, the number of sub-processors necessary for the function program to be executed at a predetermined processing speed (for example, at a processing speed higher than 100 MIPS) is 3 where the communication speed between information processing apparatus in the network is lower than 50. Where the communication speed is higher and is within a range equal to or higher than 50 but lower than 200, the necessary sub-processor number is 2.

When the main processor 21-1 included in the information processing controller 11 in the information processing apparatus 1 specifies an execution request destination slave apparatus, if comparison between the network communication speed management table illustrated in FIG. 20 and the function program necessary sub-processor numbers illustrated in FIG. 21 is performed in addition to the comparison between the required specifications for an information processing apparatus and the apparatus information of the individual information processing apparatus, then an execution process of a higher efficiency can be implemented.

More particularly, in order to execute the recording reservation command in the state wherein the information processing apparatus 2 and 6 are selected as candidates for an information processing apparatus which can execute the above-described recording reservation command, the information processing apparatus 2 or 6 must receive recording contents from a TV broadcasting tuner represented by the information processing apparatus 5. Here, the main processor 21-1 included in the information processing controller 11 in the information processing apparatus 1 reads out the necessary sub-processor numbers illustrated in FIG. 21 from the function program represented by ID=1 necessary to execute the recording reservation command. Then, the main processor 21-1 compares the read out necessary sub-processor numbers with the network communication speed management table illustrated in FIG. 20. Thus, if the main processor 21-1 specifies the information processing apparatus 2 as the information processing apparatus by which the recording reservation command should be executed, then the main processor 21-1 recognizes that two sub-processors are required because the communication speed from the (apparatus 5) to the (apparatus 2) is 100. Similarly, if the main processor 21-1 specifies the information processing apparatus 6, then since the communication speed from the (apparatus 5) to the (apparatus 6) is 300, the main processor 21-1 recognizes that one sub-processor is required.

From the foregoing, the information processing apparatus 6 is specified as the information processing apparatus by which the recording reservation command should be executed, and an execution process of a higher efficiency can be implemented thereby. Such specification of an information processing apparatus which depends upon a difference in communication speed as described above may be employed where specification cannot be performed satisfactorily only through the other discrimination factor or factors such as the processor processing capacity.

In this manner, the master apparatus issues a request for execution of processing to the specified information processing apparatus. In this instance, there is the possibility that the specified information processing apparatus may not have the function program or the sub-processor program necessary for execution of the processing. If the master apparatus has those programs, it can transmit them using the load command. However, if the master apparatus does not have the programs, then it transmits a remote load command illustrated in FIG. 22 to the specified information processing apparatus.

Figure 22:
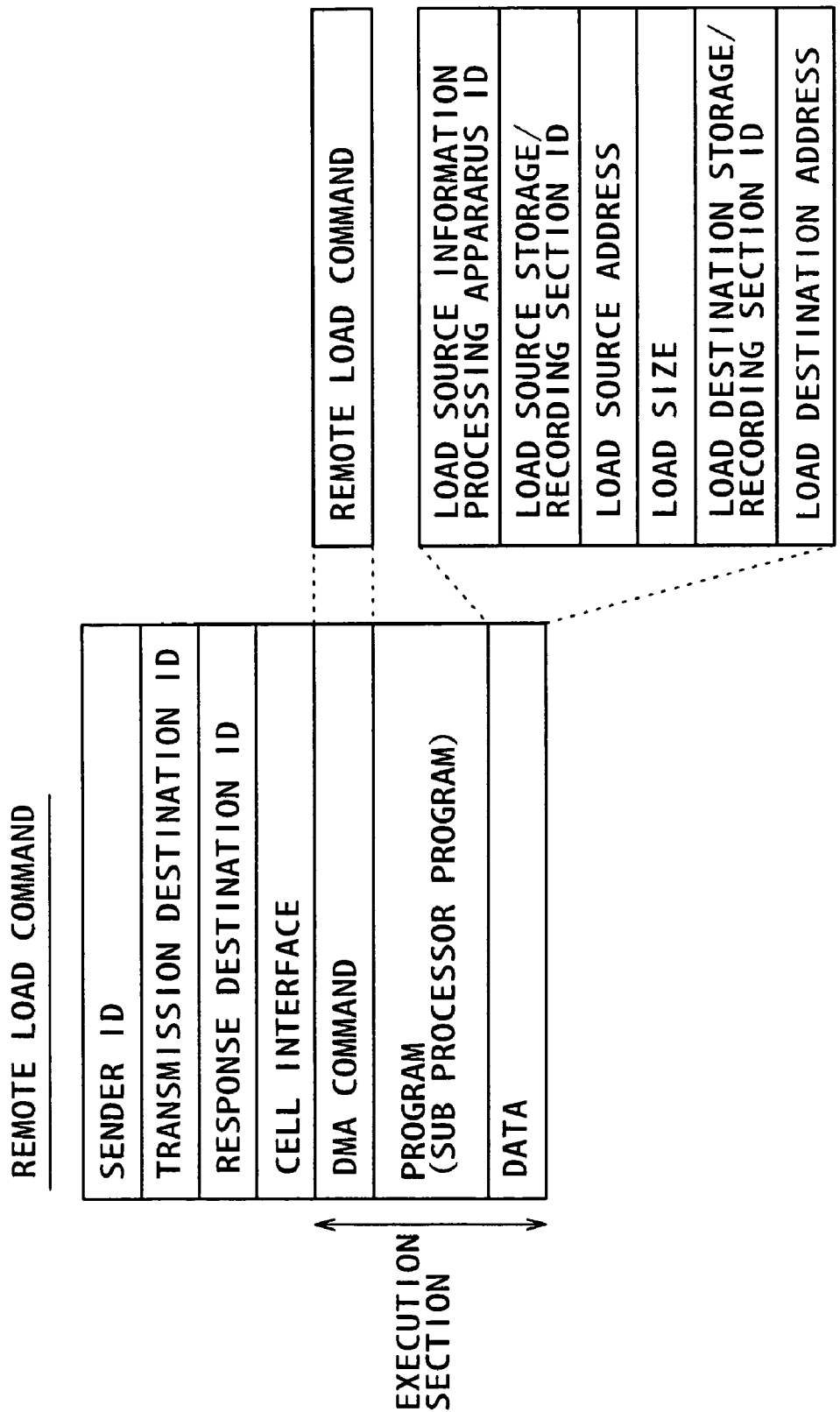
FIG. 22 is a view showing a software cell where a DMA command is a remote load command.

The remote load command is a command for requesting a certain information processing apparatus to load a program or data from a different information processing apparatus which is not the remote load command sender. Referring to FIG. 22, the load source information processing apparatus ID represents the information processing apparatus ID of the load source, and the load source storage/recording section ID represents a storage/recording section ID in the information processing apparatus of the load source. For example, ID=0 signifies the main memory ID=1 signifies a first external recording section, and ID=2 signifies a second external recording section. The load source address represents the address of the load source at which the program or data is stored/recorded. The load size represents the size of the program or data of the load object. The load destination storage/recording ID represents the storage/recording section ID in the information processing apparatus of the load destination. For example, ID=0 signifies the main memory, ID=1 signifies a first intra-processor local storage (LS), and ID=2 signifies a second intra-processor local storage (LS).

The load destination address represents the address of the main memory or a local storage in a sub-processor of the load object into which the program or data should be stored/recorded. The information processing apparatus which receives the remote load command from the master apparatus acquires the necessary function program or sub-processor program from a different information processing apparatus indicated by the load source information included in the remote control command and loads the acquire program into the memory address of the self apparatus indicated by the load destination information. After completion of the remote load command, the master apparatus transmits the kick command or the function program execution command to the specified information processing apparatus so that the programs operate in the specified information processing apparatus.

The information processing apparatus 6 receives recording contents from the TV broadcast tuner represented by the information processing apparatus 5 when the reservation time comes in accordance with the recording reservation command. Then, the information processing apparatus 6 performs processing necessary for recording such as demodulation and decoding processes using a sub-processor or sub-processors and records the broadcasting program for 2 hours on the hard disk 28-8 in the self apparatus. As described hereinabove, the network communication management program is a resident program and, as a result, the network communication speed management table illustrated in FIG. 20 is always updated and the latest communication speed is managed. Therefore, even after the information processing apparatus 6 is specified as an information processing apparatus by which the recording reservation command should be executed, the information processing apparatus by which the recording reservation command should be executed possibly may change as a result of a variation of the network communication speed.

Figure 23:
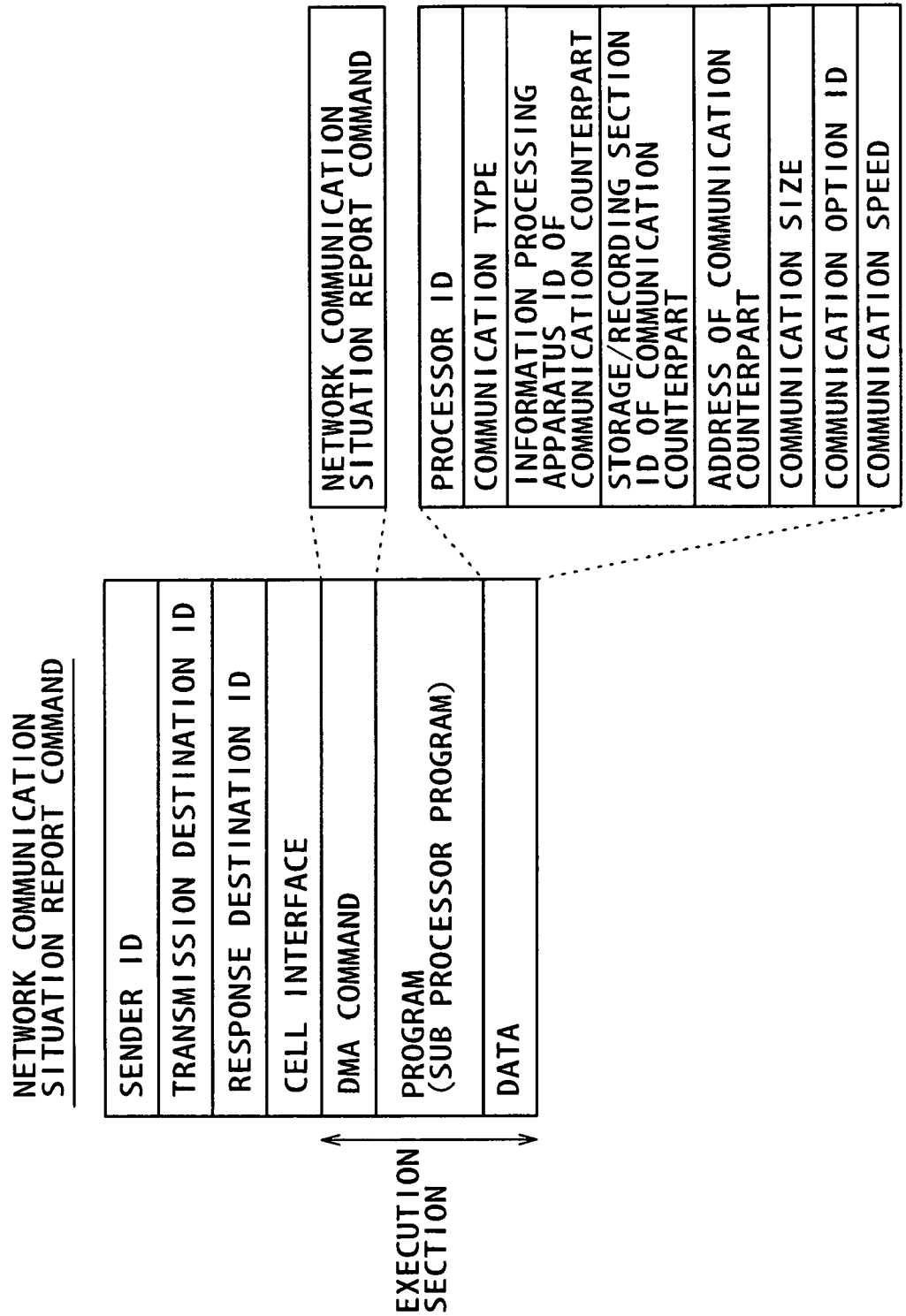
FIG. 23 is a view showing a software cell where a DMA command is a network communication situation report command.

Further, the information processing apparatus 6 transmits a software cell as a network communication situation report command illustrated in FIG. 23 to the information processing apparatus 1 serving as the master apparatus during the recording processing. Referring to FIG. 23, the process ID represents the main processor ID or a sub-processor ID of the processor within the self apparatus (information processing apparatus 6) which is communicating with the different information processing apparatus. The communication type represents a type of communication, which is 0 upon data reading out, and is 1 upon data writing. The information processing apparatus ID of communication counterpart represents the information processing apparatus ID of the counterpart of communication from and into which data reading out or data writing is performed. The storage/recording section ID of communication counterpart represents the storage/recording section ID in the information processing apparatus of the counterpart of communication from and into which data are to be read out or written. For example, ID=0 signifies the main memory, ID=1 signifies a first external recording section, and ID=2 is a second external recording section. The address of the communication counterpart represents the address in the storage/recording section at which data to be communicated is stored/recorded. The communication size represents the size of communicated data. The communication option ID is used only upon writing of data and represents an ID for specifying an after-process to be executed where some after-process such as encryption or compression is required for the communicated data. The communication speed Dspt represents the communication speed upon reading out or writing of data. A calculation method for the communication speed is described below.

First, the main processor or a sub-processor of the information processing apparatus 6 stores, when it reads out data from the main memory or an external storage section in the self apparatus or a different information processing apparatus, the start time Tro at which reading out is executed. Thereafter, the completion time Trc at which reading out of data from the readout source and data storage into the readout destination are completed is stored. Similarly, when data is written into the main memory or an external storage section in the self apparatus or a different information processing apparatus, the start time Two at which the writing is executed is stored.

Thereafter, the completion time Twc at which reading out of data from the readout source and storage/recording of data into the writing destination are completed is stored. Where the size of data to be read out is represented by Drs, the communication speed Dspt as the reading out speed is calculated in accordance with Dspt=Drs/(Trc−Tro). Further, where the size of data to be written is represented by Dws, the communication speed Dspt as the writing speed is calculated in accordance with Dspt=Dws/(Twc−Two).

The information processing apparatus 6 transmits a software cell as the network communication situation report command, which includes the calculated communication speed Dspt as the data thereof, to the information processing apparatus 1 serving as the master apparatus. Such transmission of the network communication situation report command to the information processing apparatus 1 serving as the master apparatus may not be performed every time data communication is performed, but the frequency of such transmission may be changed by suitable setting such that the transmission is performed, for example, at a ratio of once per five times of data communication.

Figure 24:
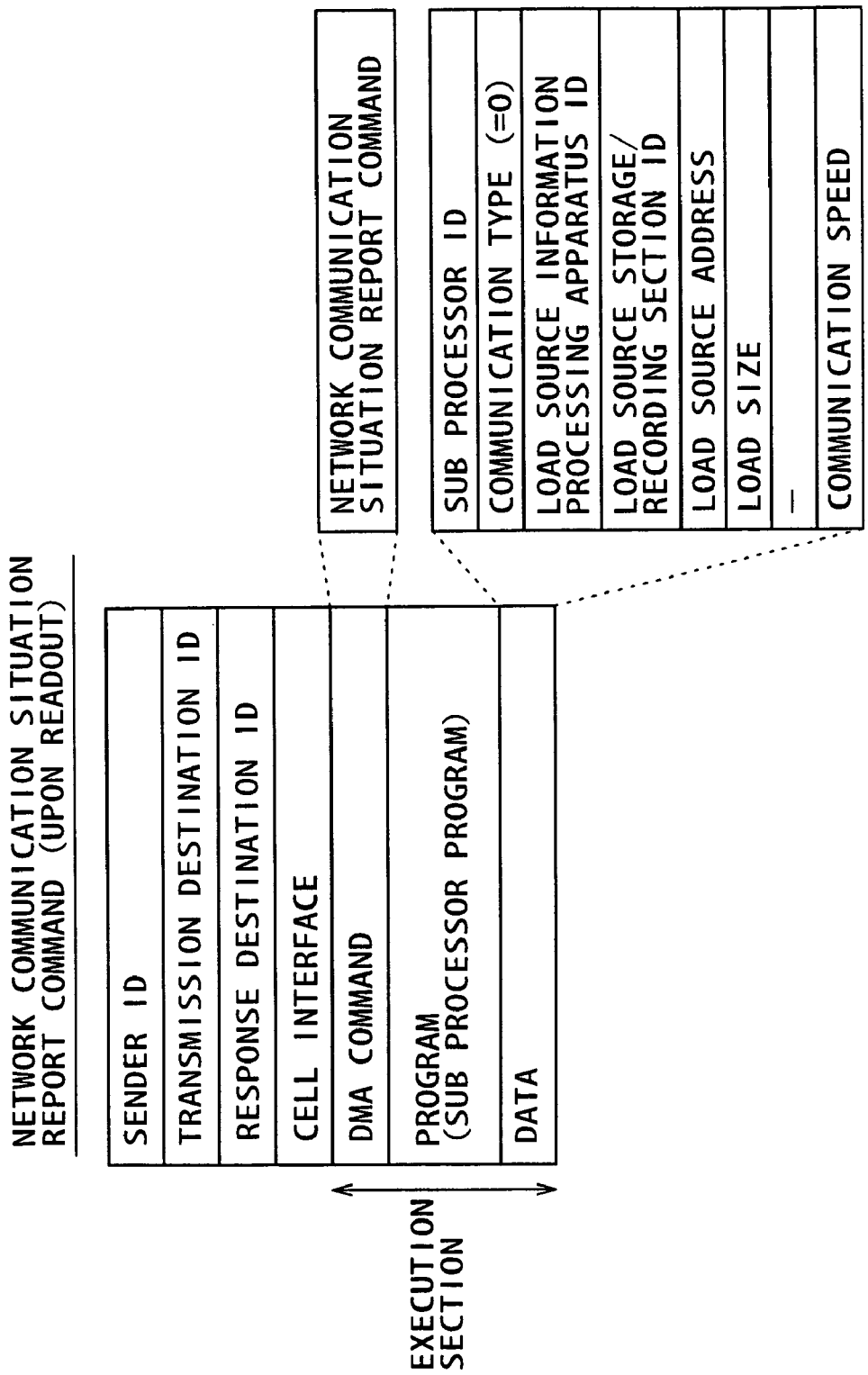
FIG. 24 is a view showing the network communication situation report command of FIG. 23 upon readout.
Figure 25:
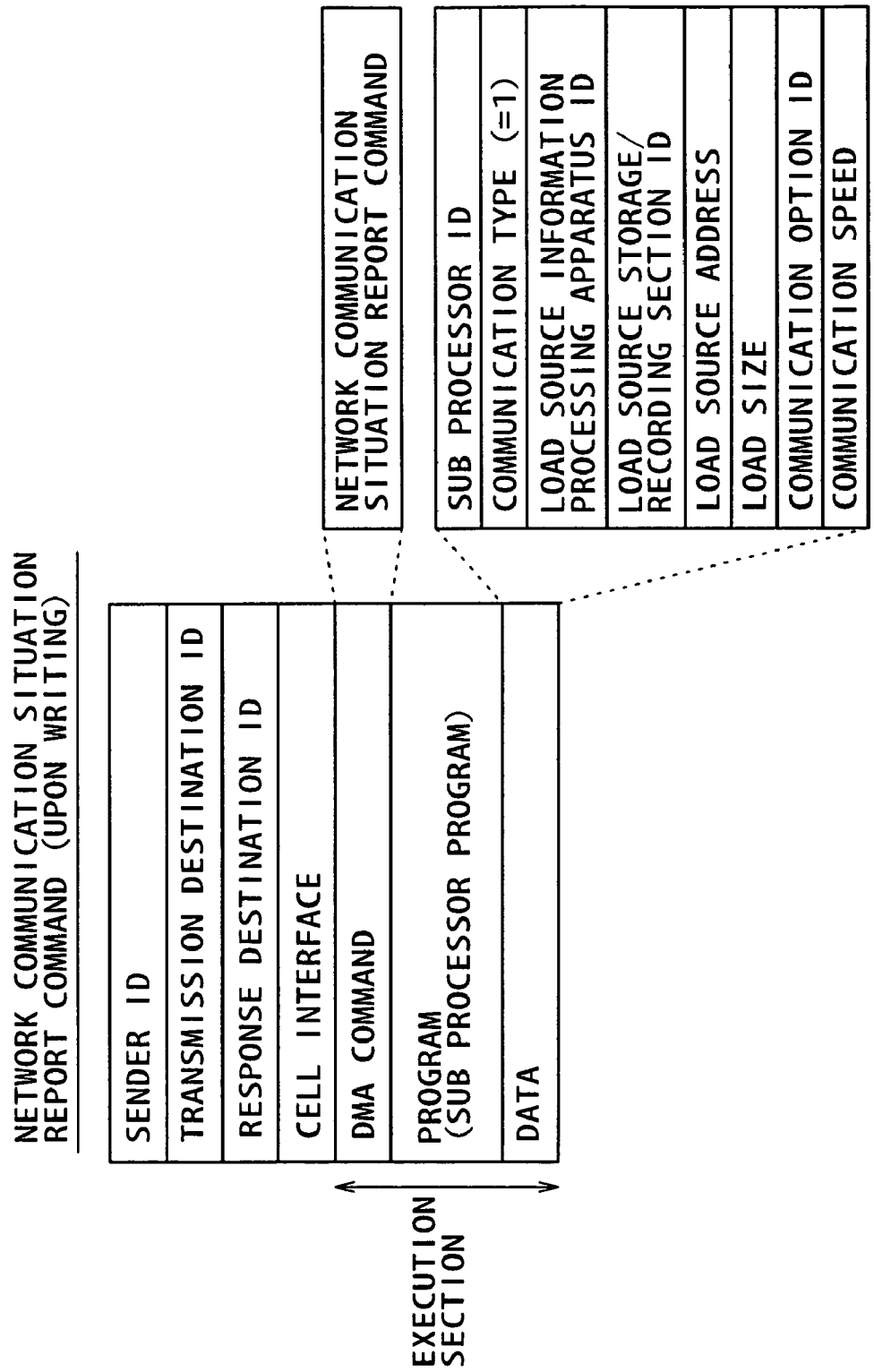
FIG. 25 is a view showing the network communication situation report command of FIG. 23 upon writing.

FIG. 24 illustrates the network communication situation report command for use upon reading out while FIG. 25 illustrates the network communication situation report command for use upon writing. The information processing apparatus 1 serving as the master apparatus receives network communication situation report commands from the information processing apparatus on the network and stores the received communication situations, for example, as a network communication situation management table illustrated in FIG. 26. FIG. 26 illustrates that reading out of recording contents of a data size of 1,024 bytes from the external recording section 28-7 in a sub-processor (ID=000058) in the information processing apparatus 6 in the form of a hard disk recorder is completed and that the communication speed Dspt then is 40. Similarly, FIG. 26 illustrates that, in the sub-processor (ID=000058) in the information processing apparatus 6, writing of recording contents of a data size of 1,024 bytes into the hard disk 28-8 in the self apparatus after necessary processing such as a decryption process and a decoding process are executed and that the communication speed Dspt is then 30. Since some data communication is listed in the network communication situation management table illustrated in FIG. 26, it signifies that the data communication is completed.

The master apparatus can utilize the network communication situation management table to grasp a progressing situation of a function program of a sub-processor program being executed. For example, if completion of processing of a function program or a sub-processor program is confirmed through supervision of the communication situation management table, the master apparatus can transmit a software cell as a program stop command illustrated in FIG. 27 to the information processing apparatus which has executed the function program or sub-processor program to immediately end the function program or sub-processor program.

Further, the master apparatus can use the communication situation management table illustrated in FIG. 26 to implement a more efficient execution process of the entire network system. In particular, for example, if it is detected that the reading out communication speed Dspt or the writing communication speed Dspt drops through supervision of the communication speed Dspt as a readout speed from the communication situation management table or the communication speed Dspt as a writing speed into the communication situation management table, then it is possible to re-construct a network system of a higher speed or a higher efficiency. In this instance, the network communication speed management table illustrated in FIG. 20 additionally may be used. On the contrary, if it is detected through supervision of the communication situation management table that, for example, the reading out communication speed Dspt or the writing communication speed Dspt rises excessively, a sufficient and necessary network system can be re-constructed. Also in this instance, the network communication speed management table additionally may be used.

Although the present invention has been described with reference to specific embodiments, those of skill in the art will recognize that changes may be made thereto without departing from the spirit and scope of the present invention as set forth in the hereafter appended claims.

The invention claimed is:

1. A network system, comprising:
   a plurality of information processing apparatuses connected to each other through a network for executing a process in a distributed fashion;
   wherein each of the information processing apparatuses comprises:
   a master/slave setting section for setting the information processing apparatus in which the master/slave setting section is provided as one of a master apparatus and a slave apparatus such that one of the information processing apparatus connected to the network is set as a master apparatus while the other information processing apparatus are set as slave apparatus;
   an apparatus information management section for managing; information regarding available hardware resources of individual ones of the information processing apparatus being connected to the network as apparatus information;
   a communication speed management section for managing; communication speeds of individual ones of the information processing apparatus connected to the network;
   a distributed processing requesting section for specifying at least one of the information processing apparatus by which the process is executed based on the information managed by the apparatus information management section and the communication speed management section and for issuing a request for execution of the process to the specified information processing apparatus;
   a communication speed measurement command transmission section for periodically transmitting a communication speed measurement command including information of time of the transmission to different ones of the information processing apparatus connected thereto through the network;
   a communication speed response section for calculating, when the communication speed measurement command is received, a communication speed based on time of the reception and the transmission included in the communication speed measurement command and issuing a response of the calculated communication speed to the information processing apparatus set as the master apparatus; and wherein each of the information processing apparatus further comprises at least one sub-processor whose schedule is managed by a processor, and the distributed process requesting section specifies at least one of the information processing apparatus by which the process is executed based on a correlation defined in advance between the communication speed and a necessary number of sub-processors.

2. A network system as claimed in claim 1, wherein each of the information processing apparatus further comprises;
   a data communication speed management section for managing communication speed management section for managing communication speeds of processing data of the information processing apparatus by which the process is being executed.

3. A distributed processing method wherein a process is executed in a distributed fashion by a plurality of information processing apparatus connected to each other through a network, the method comprising;
   a first step of setting one of the information processing apparatus as a master apparatus while the other information processing apparatus are set as slave apparatus;
   a second step executed by the information processing apparatus set as the master apparatus of managing information regarding available hardware resources of individual ones of the information processing apparatus connected to the network as apparatus information and managing communication speeds of individual ones of the information processing apparatus connected to the network;
   a third step executed by the information processing apparatus set as the master apparatus of specifying at least one of the information processing apparatus by which the process is executed based on the information managed at the second step and issuing a request for execution of the process to the specified information processing apparatus; and
   wherein each of the information processing apparatus periodically transmits a communication speed measurement command including information of time of the transmission to different ones of the information processing apparatus connected thereto through the network, and calculates, when the communication speed measurement command is received, a communication speed based on time of the reception and the transmission time included in the communication speed measurement command and issues a response of the calculated communication speed to the information processing apparatus set as the master apparatus; and wherein each of the information processing apparatus includes at least one sub-processor whose schedule is managed by a processor, and specifies, where the information processing apparatus is set as the master apparatus, at least one of the information processing apparatus by which the process is executed based on a correlation defined in advance between the communication speed and a necessary number of sub-processors.

4. A distributed processing method as claimed in claim 3, wherein each of the information processing apparatus further manages, where the information processing apparatus is set as the master apparatus, communication speeds of processing data of those of the information processing apparatus by which the process is being executed.

5. An information processing apparatus comprising:
a communication section for communication with one or more other information processing apparatuses connected thereto through a network;
a master/slave setting section for setting the information processing apparatus one of a single master apparatus and one of slave apparatus among all of the information processing apparatus connected to the network;
an apparatus information management section for managing, where the information processing apparatus is set as the master apparatus by the master/slave setting section, information regarding available hardware resources of individual ones of the information processing apparatus connected to the network as apparatus information;
a communication speed management section for managing, where the information processing apparatus is set as the master apparatus by the master/slave setting section, communication speeds of individual ones of the information processing apparatus connected to the network;
a distributed processing requesting section for specifying at least one of the information processing apparatus by which a process is executed based on the information managed by the apparatus information management section and the communication speed management section and issuing a request for execution of the process to the specified information processing apparatus; and wherein the information processing apparatus is set as the master apparatus by the master/slave setting section, a data communication speed management section for managing communication speeds of processing data of those of the information processing apparatus by which the process is being executed;
a communication speed measurement command transmission section for periodically transmitting a communication speed measurement command including information of time of the transmission to different ones of the information processing apparatus connected thereto through the network;
a communication speed response section for calculating, when the communication speed measurement command is received, a communication speed based on time of the reception and the transmission time included in the communication speed measurement command and issuing a response of the calculated communication speed to the information processing apparatus set as the master apparatus ;and said information processing apparatus further comprising at least one sub-processor whose schedule is managed by a processor, the distributed process requesting section specifying at least one of the information processing apparatus by which the process is executed based on a correlation defined in advance between the communication speed and a necessary number of sub-processors.

6. An information processing apparatus as claimed in claim 5, further comprising at least one sub-processor whose schedule is managed by a processor, the distributed process requesting section specifying at least one of the information processing apparatus by which the process should be executed based on a correlation defined in advance between the communication speed and a necessary number of sub-processors.

* * * * *